US006545425B2

(12) United States Patent
Victor

(10) Patent No.: US 6,545,425 B2
(45) Date of Patent: Apr. 8, 2003

(54) USE OF A FREE SPACE ELECTRON SWITCH IN A TELECOMMUNICATIONS NETWORK

(75) Inventor: Michel N. Victor, Fenton, MI (US)

(73) Assignee: Exaconnect Corp., Flint, MI (US)

(*) Notice: Subject to any disclaimer, the term of this patent is extended or adjusted under 35 U.S.C. 154(b) by 0 days.

(21) Appl. No.: 09/898,264

(22) Filed: Jul. 3, 2001

(65) Prior Publication Data

US 2002/0047637 A1 Apr. 25, 2002

Related U.S. Application Data

(63) Continuation-in-part of application No. 09/731,216, filed on Dec. 6, 2000, now Pat. No. 6,407,516.

(60) Provisional application No. 60/207,391, filed on May 26, 2000, provisional application No. 60/232,927, filed on Sep. 15, 2000, provisional application No. 60/216,031, filed on Jul. 3, 2000, provisional application No. 60/222,003, filed on Jul. 31, 2000, provisional application No. 60/245,584, filed on Nov. 6, 2000, provisional application No. 60/261,209, filed on Jan. 16, 2001, provisional application No. 60/260,874, filed on Jan. 12, 2001, provisional application No. 60/262,363, filed on Jan. 19, 2001, provisional application No. 60/265,866, filed on Feb. 5, 2001, provisional application No. 60/272,326, filed on Mar. 2, 2001, and provisional application No. 60/294,329, filed on May 30, 2001.

(51) Int. Cl.[7] .......................... G09G 3/10; H01J 40/06; H01S 3/00

(52) U.S. Cl. .................... 315/169.3; 313/542; 313/384; 313/373; 359/335; 359/57; 359/58

(58) Field of Search ................................ 313/412, 413, 313/414, 447, 373, 384, 409, 542; 315/365, 169.3, 111.81; 307/151; 359/335, 57, 58, 110, 118

(56) References Cited

U.S. PATENT DOCUMENTS 2,667,599 A 1/1954 Rajchman .................... 315/11
3,641,384 A 2/1972 Lund et al. ................. 313/161
3,740,607 A 6/1973 Silzars et al. ................. 315/15

(List continued on next page.)

FOREIGN PATENT DOCUMENTS

EP 0 265 888 A2 A3 5/1988
EP 0 306 173 A1 3/1989
EP 9 530 981 A1 3/1993

(List continued on next page.)

OTHER PUBLICATIONS

W.J. Orvis, et al., "A Progress Report on the Livermore Miniature Vacuum Tube Project", 1989, Lawrence Livermore National Laboratory, pp. 20.3.1–20.3.3,20.4.1–20.4.4.

(List continued on next page.)

*Primary Examiner*—Don Wong
*Assistant Examiner*—Tuyet T. Vo
(74) *Attorney, Agent, or Firm*—Harness, Dickey & Pierce, P.L.C.

(57) ABSTRACT

A communications system that includes one or more free space electron switches. The free space electron switch employs an array of electron emitters, where each emitter is responsive to an RF or optical input signal on an input channel. Each emitter includes a cathode that emits electrons in response to the input signal. Each emitter further includes a focussing/accelerating electrode for collecting and accelerating the emitted electrons into an electron beam. Each emitter further includes an aiming anode that directs the beam of electrons to a desired detector within an array of detectors that converts the beam of electrons to a representative RF or optical signal on an output channel. Each emitter may include a modulating electrode that generates an electric field to modulate data onto the beam of electrons. The communications systems employing the switch can be an ISDN, DSLAM networks, packet routing systems, ADSL networks, PBX systems, local exchange systems, etc.

39 Claims, 11 Drawing Sheets

U.S. PATENT DOCUMENTS

| | | | | |
|---|---|---|---|---|
| 3,749,961 A | | 7/1973 | Bates et al. | 315/3 |
| 3,893,157 A | | 7/1975 | Silzars et al. | 357/69 |
| 3,935,500 A | | 1/1976 | Oess et al. | 313/495 |
| 3,936,690 A | | 2/1976 | Salgo | 313/392 |
| 3,943,277 A | | 3/1976 | Everly et al. | 178/6.8 |
| 3,980,919 A | | 9/1976 | Bates et al. | 313/453 |
| 4,110,749 A | | 8/1978 | Janko et al. | 340/365 C |
| 4,207,492 A | | 6/1980 | Tomison et al. | 315/3 |
| 4,213,192 A | | 7/1980 | Christensen, Sr. | 365/118 |
| 4,280,186 A | | 7/1981 | Hidai et al. | 364/518 |
| 4,328,466 A | | 5/1982 | Norris, Jr. et al. | 330/308 |
| 4,333,035 A | | 6/1982 | Parker et al. | 313/411 |
| 4,663,559 A | | 5/1987 | Christensen | 313/336 |
| 4,725,736 A | | 2/1988 | Crewe | 250/396 R |
| 4,760,567 A | | 7/1988 | Crewe | 369/101 |
| 4,764,818 A | | 8/1988 | Crew | 358/347 |
| 4,817,053 A | | 3/1989 | Ikeda et al. | 365/113 |
| 5,012,153 A | | 4/1991 | Atkinson et al. | 313/336 |
| 5,068,580 A | | 11/1991 | Smith et al. | 315/366 |
| 5,077,143 A | | 12/1991 | Barraclough et al. | 428/690 |
| 5,150,019 A | | 9/1992 | Thomas et al. | 315/350 |
| 5,475,280 A | | 12/1995 | Jones et al. | 313/309 |
| 5,541,473 A | | 7/1996 | Duboc, Jr. et al. | 313/422 |
| 5,557,177 A | | 9/1996 | Engle | 315/366 |
| 5,557,596 A | | 9/1996 | Gibson et al. | 369/101 |
| 5,561,339 A | | 10/1996 | Jones et al. | 313/309 |
| 5,572,042 A | | 11/1996 | Thomas et al. | 257/10 |
| 5,578,901 A | | 11/1996 | Blanchet-Fincher et al. | 313/496 |
| 5,608,283 A | | 3/1997 | Twichell et al. | 313/309 |
| 5,650,337 A | | 7/1997 | Cahen et al. | 437/16 |
| 5,746,635 A | | 5/1998 | Spindt et al. | 445/24 |
| 5,767,620 A | | 6/1998 | Onodaka | 313/495 |
| 5,793,155 A | | 8/1998 | Vasche | 313/309 |
| 5,814,926 A | | 9/1998 | Tomihari | 313/309 |
| 5,834,331 A | | 11/1998 | Razeghi | 438/40 |
| 5,858,619 A | | 1/1999 | Chang et al. | 430/312 |
| 5,869,842 A | | 2/1999 | Kang et al. | 250/551 |
| 5,894,188 A | | 4/1999 | Chakvorty et al. | 313/309 |
| 5,939,725 A | * | 8/1999 | Muraki | 250/491.1 |
| 5,986,399 A | | 11/1999 | VanVeen et al. | 313/495 |
| 6,002,199 A | | 12/1999 | Spindt et al. | 313/309 |
| 6,008,126 A | | 12/1999 | Leedy | 438/667 |
| 6,010,918 A | | 1/2000 | Marino et al. | 438/20 |
| 6,020,257 A | | 2/2000 | Leedy | 438/626 |
| 6,040,808 A | | 3/2000 | Knox et al. | 345/13 |
| 6,042,900 A | | 3/2000 | Rakhimov et al. | 427/577 |
| 6,051,921 A | | 4/2000 | Beetson et al. | 313/433 |
| 6,057,636 A | | 5/2000 | Sakai et al. | 313/306 |
| 6,060,331 A | | 5/2000 | Shakouri et al. | 438/22 |
| 6,097,092 A | | 8/2000 | Natzle | 257/758 |
| 6,124,665 A | | 9/2000 | Derraa | 313/309 |
| 6,137,214 A | | 10/2000 | Raina | 313/309 |
| 6,144,144 A | | 11/2000 | Cleeves et al. | 313/309 |
| 6,171,971 B1 | | 1/2001 | Natzle | 438/706 |
| 6,201,343 B1 | | 3/2001 | Spindt et al. | 313/310 |
| 6,201,851 B1 | | 3/2001 | Piestrup et al. | 378/121 |
| 6,204,087 B1 | | 3/2001 | Parker et al. | 438/56 |
| 6,204,596 B1 | | 3/2001 | Macaulay et al. | 313/310 |
| 6,215,243 B1 | | 4/2001 | Janning | 313/496 |

FOREIGN PATENT DOCUMENTS

| | | |
|---|---|---|
| EP | 11204047 | 7/1999 |
| ES | 2 024 941 | 3/1992 |
| GB | 1417297 | 12/1975 |
| GB | 2 318 208 A | 4/1998 |

OTHER PUBLICATIONS

Yoshiko Hara, "Cold Cathode Emitter Promises Ultra–Bright Flat Panels", EETimes.com, http://eet/com/news/97/947news/emitter.html, 2 pgs.

Ray Horak, "Communications Systems & Networks", 2nd edition, The M&T Networking Technology Series, 1999, pp 2, 22, 82, 83, 163, 254, 266, 267, 342–344.

* cited by examiner

USE OF A FREE SPACE ELECTRON SWITCH IN A TELECOMMUNICATIONS NETWORK

CROSS REFERENCE TO RELATED APPLICATIONS

This application is a continuation-in-part application of U.S. Ser. No. 09/731,216, entitled "Free Space Electron Switch", filed Dec. 6, 2000, now U.S. Pat. No. 6,407,516 which claimed the benefit of priority of U.S. provisional applications: Ser. No. 60/207,391, entitled "Free Space Electron Switch Fabric", filed May 26, 2000; Ser. No. 60/232,927, entitled "Optical Switch", filed Sep. 15, 2000. This application claims the benefit of priority of U.S. provisional applications: Serial No. 60/216,031, entitled "Freespace Electron Switch Fabric, filed Jul. 3, 2000; Ser. No. 60/222,003, entitled "Freespace Electron Multiplexer (serializer) and Demultiplexer (deserializer)", filed Jul. 31, 2000; Ser. No. 60/245,584, entitled "Photon-Electron-Photon Switch", filed Nov. 6, 2000; Ser. No. 60/261,209, entitled Switching and Processing Using Freespace Electrons", filed Jan. 16, 2001; Ser. No. 60/260,874, entitled "Details of a Freespace Electron Switch", filed Jan. 12, 2001; Ser. No. 60/262,363, entitled "An Analog Serializer and Deserializer", filed Jan. 19, 2001; Ser. No. 60/265,866, entitled "Vacuum Microelectronic Components", filed Feb. 5, 2001; Ser. No. 60/272,326, entitled "A Photocathode-Based Optical Receiver", filed Mar. 2, 2001; and U.S. provisional application No. 60/294,329 entitled "Telecommunication's Switch Subsystem for the Access, Metro and Core Infrastructure", mailed May 30, 2001, the entire contents of which are hereby incorporated by reference into the present application.

BACKGROUND OF THE INVENTION

1. Field of the Invention

This invention relates generally to an electron switch for use in a communications network and, more particularly, to a free space electron switch for switching purposes in a communications network, where the switch employs an array of cathodes, each cathode being responsive to an optical or RF input signal on a communications channel and generating free space electrons in response thereto, and where the electron beams are selectively steerable by an aiming anode towards a particular receiver in an array of receivers associated with a plurality of output channels.

2. Discussion of the Related Art

State of the art telecommunications systems and networks typically employ optical fibers to transmit optical signals separated into optical packets carrying information over great distances. An optical fiber is an optical waveguide including a core having one index of refraction surrounded by a cladding having, another, lower, index of refraction so that optical signals propagating through the core at certain angles of incidence are trapped therein. Typical optical fibers are made of high purity silica including certain dopant atoms that control the index of refraction of the core and cladding.

The optical signals may be separated into channels to distinguish groups of information. Different techniques are known in the art to identify the channels through an optical fiber. These techniques include time-division multiplexing (TDM) and wavelength-division multiplexing (WDM). In TDM, different slots of time are allocated for the various packets of information. In WDM, different wavelengths of light are allocated for different data channels carrying the channels. More particularly, sub-bands of light within a certain bandwidth of light are separated by predetermined wavelengths to identify the various data channels.

When optical signals are transmitted over great distances through optical fibers, attenuation within the fibers reduces the optical signal strength. Therefore, detection of the optical signals over background noise becomes more difficult at the receiver. In order to overcome this problem, optical amplifiers are positioned at predetermined intervals along the fiber, for example, every 80–100 km, to provide optical signal gain. Various types of amplifiers are known in the art that provide an amplified replica of the optical signal, and provide amplification for the various modulation schemes and bit rates that are used.

Further, switching networks are periodically provided along the optical fiber path so that the optical packets of information can be switched and routed in a desired manner to reach their ultimate destination. Address bits within the optical packets provide location codes so that the switching devices can direct the optical packets to the appropriate optical fiber. Alternatively, the switching devices may be controlled by data that is provided out-of-band, via separate lines of communications. The switching networks at a particular location within the communications system may be required to support hundreds of thousands of data channels.

Because photons are highly non-reactive to the propagation medium of the optical fiber and to each other, providing suitable photon switching devices to redirect the optical signal is typically difficult. Further, pure optical switching is difficult to achieve because photons cannot be directed or steered without modifying the physical medium through which they propagate. Photon steering is typically accomplished by reflecting the photons off of moveable mirrors, or by passing the photons through LCD molecules or temperature-sensitive crystals. Because the process of modifying the physical medium to steer an optical beam tends to be slow and unwieldy, few photon switching technologies provide a fast enough response time necessary for state-of-the-art optical switching speeds, and those that may be fast enough typically cannot be scaled suitably to provide a sufficient number of output ports. Scalability defines the number of output ports that can be provided in the switch.

Moveable mirror switches employing micro-electrical mechanical systems (MEMS) are one type of mirror known in the art to switch an optical signal. Movable mirror switches of this type are typically separated into two categories, particularly, infinitely adjustable mirrors employing analog MEM switches, and two position mirrors employing digital MEMS switches. Digital MEMS switches potentially provide a relatively low switching speed (latency), but are not scaleable. Further, the number of internal components in a digital MEMS switch increases exponentially as the number of output ports increases, making them difficult to scale beyond a few hundred ports. Thus, large-scale MEMS switches typically employ adjustable analog mirrors that allow for greater scalability. However, analog MEMS switches typically have a high switching latency (low switching speed) requiring milliseconds to switch.

The longevity and reliability of MEMS switches for optical signal switching applications are suspect. Currently, a typical MEMS switch has a life on the order of one billion switching cycles. Therefore, if an analog MEM switch could operate fast enough to switch optical packets at commercially acceptable speeds, the switch would barely survive one minute before reaching the end of its operating life. Further, MEMS switches are sensitive to shocks, are fragile, and are bulky.

Additionally, current generation MEMS switches require the use of regenerator lasers, even in course, fiber-by-fiber switching applications, because of the lack of reflectivity of the mirrors. It is known to increase the reflectivity of the mirrors by, for example, gold plating the mirrors. However, it is not clear that this will eliminate the need for regenerator lasers, especially in real-world networks that have multiple hops and long-transmission lengths.

Practical lambda-by-lambda switching requires more than passively redirecting wavelengths from fiber to fiber. In order to prevent wavelength collisions, it is necessary to change the wavelength of the lambda switches as they hop from switch to switch. This requires the use of regenerator lasers. Tunable lasers do not mitigate this problem, because they still require that a given wavelength signal be reserved from end-to-end of the network. Employing wasting circuits, where the number of circuits is significantly increased beyond what is necessary to handle the required bandwidth, can possibly solve the collision problem.

Other photon switching technologies are available other than MEMS switches. These switching technologies include the Agilant bubble switch, LCD switches, switches that steer light using temperature-sensitive crystals, as well as other switches known in the art. However, all of these technologies typically suffer from lack of scalability and have a high switching latency.

Electronic switching offers an alternative to pure photonic switching. One well known technique of electronic switching for telecommunications systems employing optical fibers is by using single-stage crossbars. A crossbar is a semiconductor-based logic device that performs the switching operation. However, the number of internal components in a crossbar increases exponentially, or nearly exponentially, as the number of output ports increases. As a result, most crossbars have a maximum of 64 output ports. Next generation crossbars will provide a complex internal interconnect scheme that may allow the output port count to exceed 512 ports.

Crossbars are limited by the clock speed of their semiconductor logic gates, which is typically at or below 1 GHz. To obtain higher port speeds, multiple slower ports must be combined in order to create a single fast port, which greatly decreases the overall port count. For example, for a crossbar that runs at 622 MHz, 66 ports must be combined to create a single OC-768 port. Also, the de-multiplexers and multiplexers that separate the bit stream and then recombine the stream is complex and requires exotic switching technology, especially for OC-192 bit rates and beyond.

CLOS is an interconnection topology that allows smaller crossbars to be combined to form a larger, higher port count switch. Almost all existing and planned crossbar-based switches will be built using the CLOS topology. CLOS requires a large number of crossbars in order to obtain a given port count. As a result, CLOS interconnected crossbar switches have very large footprints, and consume a large amount of power.

Switching speed has also presented a problem with CLOS-based switches. Semiconductor CLOS switches typically require tens to hundreds of microseconds to establish a connection from an input port to an output port. Moreover, their switching speed is non-deterministic, in that the amount of time needed to establish a connection is highly unpredictable. For packet-by-packet switching applications, the complexity of the packet forwarding engines and traffic managers that control the switch is greatly increased because it is difficult for the switch to guarantee FIFO packet behavior. Further, unwanted effects are introduced into the output packet stream, such as jitter. It is likely that many of the CLOS crossbar-based electronic switches that are used within OEO optical cross-connects have such a slow switching speed and are highly unpredictable that they may not be suitable for packet-by-packet switching.

Board-to-board connector density is also a serious concern with CLOS switches. For large CLOS switches, nearly four out of every five interconnect is internal to the switch and cannot be used for external, through-switch bandwidth. Therefore, CLOS based switches are limited by the connector density, trace density and interconnects needed to create all of the internal intra-switch bandwidth. As a result, it has been suggested that CLOS switches hit hard limits in terms of board-to-board connector density at 512 output ports.

Also, because CLOS switches have a high component count, their reliability is an important concern. Any switch that consists of a full bay of ICs will support complex failure-recovery and re-routing capabilities. Also, as with all semiconductor logic-based switches, bit rate per port is limited by the clock rate of the logic gates.

Regardless of the drawbacks discussed above, the use of electrons are well suited for switching applications because electrons can be easily steered by electrostatic and electromagnetic fields. However, known electron switches have directed the electrons through digital logic gates within semiconductors. Thus, as discussed above, these devices have proved complex and difficult to scale for switching applications, and they are limited by the speed at which their solid-state logic gates are capable of switching.

SUMMARY OF THE INVENTION

In accordance with the teachings of the present invention, a communications system is disclosed that includes one or more free space electron switches. The free space electron switch employs an array of electron emitters, where each emitter is responsive to an RF or optical input signal on an input channel. Each emitter includes a cathode that emits electrons in response to the input signal. Each emitter further includes a focussing/accelerating electrode for collecting and accelerating the emitted electrons into an electron beam. Each emitter further includes an aiming anode that directs the beam of electrons to a desired detector within an array of detectors. The detector then converts the beam of electrons to a representative RF or optical signal on an output channel. The anodes are selectively steerable so that the electron beam is directed to the detector associated with a desired output channel to provide the switching.

The cathode can be a cold cathode, hot cathode or photocathode depending on the particular application. In one embodiment, the cathode is a photocathode that converts an optical input signal to an electron beam, and the detectors are e-beam lasers that convert electrons to an optical signal. In another embodiment, the cathode is a cold cathode that receives an electrical signal and generates the electron beam therefrom. In that embodiment, the emitter includes a modulating electrode that generates an electric field to modulate data onto the electron beam. Beam blanking can also be used to provide electron beam modulation.

The communications system employing the switch can be an ISDN, DSLAM networks, packet routing systems, ADSL networks, PBX systems, local exchange systems, etc. The free space electron switch also has application for use in a multiplexer or demultiplexer in the system.

Additional objects, advantages and features of the present invention will become apparent from the following description and appended claims, taken in conjunction with the accompanying drawings.

DETAILED DESCRIPTION OF THE EMBODIMENTS

The following discussion of the embodiments of the invention directed to a free space electron switch used in conjunction with various telecommunication systems is merely exemplary in nature, and is in no way intended to limit the invention or its applications or uses.

Figure 1:
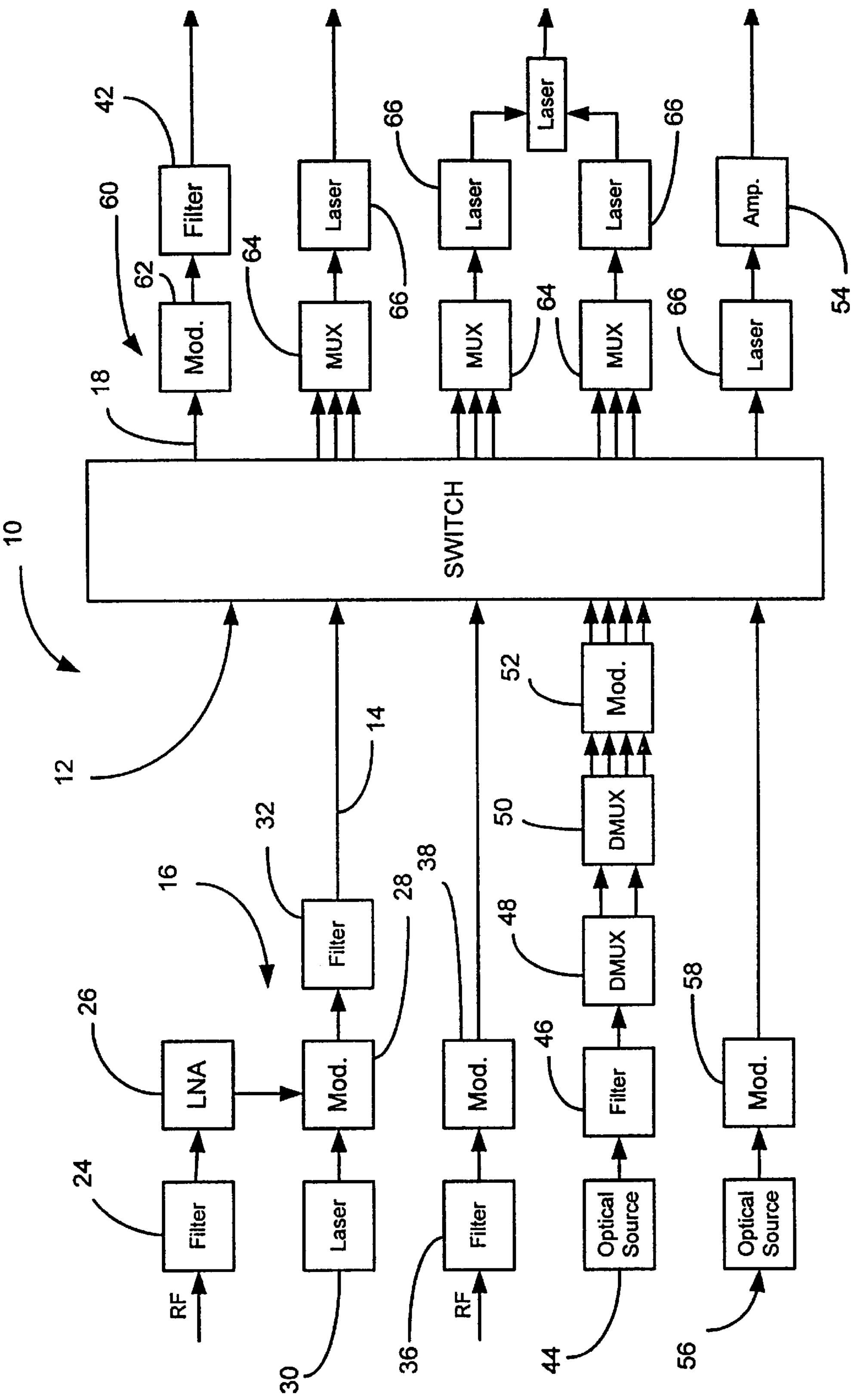
FIG. 1 is a block diagram a telecommunications system, employing a free space electron switch, according to an embodiment of the present invention.

FIG. 1 is a block diagram of a telecommunications system 10 employing a free space electron switch 12, according to the invention. The switch 12 is responsive to a plurality of optical signals and RF signals on input lines 14 in connection with various communications channels 16. Only a few of the channels are shown, but, as would be appreciated by those skilled in the art, a practical switch of the type discussed herein would have thousands of input channels. As will be discussed in detail below, the switch 12 directs or switches the signals on the various input lines 14 to one or more of a plurality of output lines 18 in connection with various communications channels 20 at the output of the switch 12. The electron switch 12 generates a stream of free space electrons in response to an input signal on the input lines 14, and selectively directs the electrons to a receiver associated with one of the output lines 18.

In an optical system, the electron switch 12 receives a plurality of optical input signals on a bundle of optical fibers, converts the optical input signals to a plurality of free space electron beams that are modulated with data, and then converts the electrons back to an optical signal that propagates along the optical fiber of an appropriate output line 18 to the desired destination. Switches of the type discussed herein may be able to receive signals on several thousand input channels and output signals on several thousand output channels.

FIG. 1 is intended to show a general representation of the various types of RF and optical channels 16 that can be used in connection with the free space switch 12 of the invention. In one channel 16, an RF input signal is applied to a bandpass filter 24 that filters the input signal to the desired frequency range. The filtered RF signal is then applied to a low noise amplifier (LNA) 26 that amplifies the signal to a useable level. The amplified RF signal is then used to modulate an optical signal in an optical modulator 28, where a light beam from a laser 30 is the optical signal that is modulated. The modulated optical signal from the laser 30 is then output on an optical fiber 32 that is an input line 14 to the switch 12.

In another channel 16, an RF input is applied to a bandpass filter 36 to filter the signal to the desired frequency range, that is then demodulated by a demodulator 38. The demodulated signal in this channel is applied to the switch 12 as an RF input on an input line 14. In another example, the RF input is applied directly to the switch 12. As would be appreciated by those skilled in the art, other components could be employed in a telecommunications system of the type being described herein.

In another channel 16, the switch 12 receives an optical input from an optical source 44, such as a laser, that is filtered by an optical bandpass filter 46. The optical signal from the filter 46 is demultiplexed by a wavelength demultiplexer 48 and a frequency demultiplexer 50 into four separate channels, as shown. The signals on the separated channels are demodulated by a demodulator 52 and applied as four inputs to the switch 12, as shown. In another channel, an optical input signal from a source 56 is directly applied to an optical demodulator 58, and then to the switch 12 as an input signal, as shown.

The output lines 18 may include modulators 62 that modulate information onto the optical or RF signals; multiplexers 64 that multiplex a plurality of parallel lines onto a single serial line; lasers 66 that generate suitable optical signals for propagation on optical fibers; amplifiers 54 for amplifying the optical signals; and filters 42 for filtering the RF or optical signals to the desired bandwidth. As will be appreciated by those skilled in the art, other signal devices used in connection with optical and RF data channels can be used, such as photodetectors, frequency mixers, etc.

Figure 2:
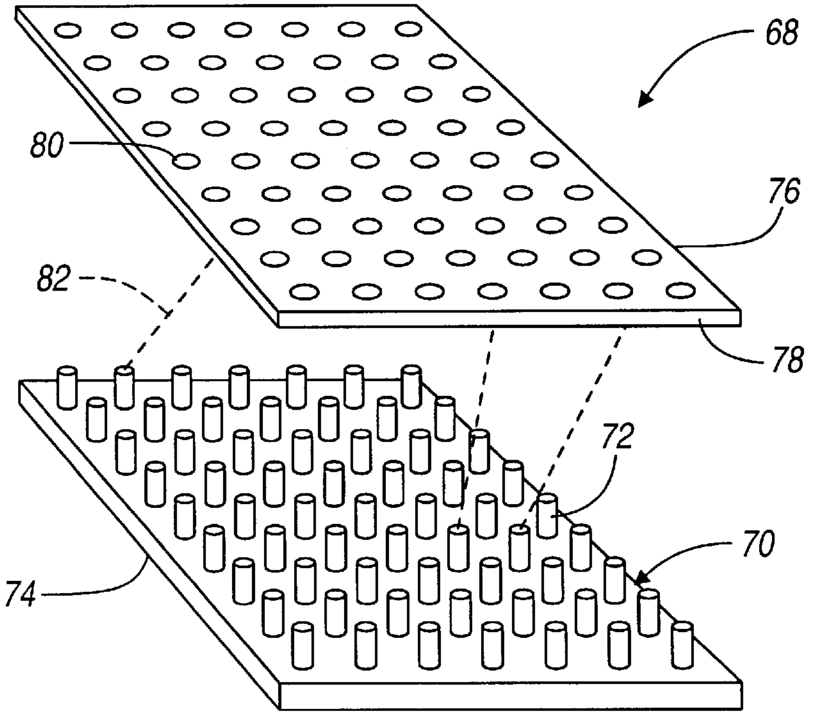
FIG. 2 is a perspective view of a portion of the switch shown in the system of FIG. 1.

FIG. 2 is a perspective view of a switch 68 providing a general representation of the switch 12. As would be understood by those skilled in the art, the various layers of the switch 68, some of which are discussed below, would be formed by any suitable semiconductor fabrication technique. The switch 68 includes an emitter array 70 having a plurality of emitters 72 formed on a substrate 74 made of a semiconductor material, such as silicon. Spaced therefrom is a detector array 76 formed in a dielectric plate 78 having a plurality of detectors 80 that will be discussed in more detail below. The term "detector" as used herein identifies a device that receives and converts the electrons to a representative voltage, and then to an RF or optical signal. Other terms, such as receiver, port, target, etc., may be used herein to identify the same type of device. Each emitter 72 receives an optical or electrical signal from one of the input channels 16, and generates a free space electron beam 82 in response thereto. The switch 68 would be positioned in a vacuum enclosure so that the electron beams would propagate from the array 70 to the array 76 in a vacuum. The distance between the arrays 70 and 76 would be on the order of 1 cm while the distance between emitters 72 in the array would be on the order of several microns.

The emitters 72 can include any suitable cathode device, such as a hot (thermionic) cathode, a cold cathode or a photocathode, that is responsive to an optical or electrical signal, and converts the signal to the electron beam 82. Photocathodes may be used when the input signal is optical and cold cathodes may be used when the input signal is electrical. Further, the array 70 can include a mix and match of the various types of cathodes discussed herein in various applications. Photocathodes typically have a very fast response time, allowing the use of very high data rates. Additionally, the input optical signal may modulate the photocathodes directly, without the use of a gate or modulating electrode. The electron beam 82 is directed to a predetermined detector 80 so that the electrical signal on the input channel 16 can be output on the desired output channel 18. Each emitter 72 in the array 70 is selectively addressable so that its electron beam 82 can be directed to any one of the detectors 80 in a desirable manner. Although the various emitters 72 are shown separate from one another in this embodiment, in an alternate embodiment, each of the various layers of the emitters 72, discussed in part below, can be part of a common array separated by suitable insulating layers.

Many types of detectors are known in the art that are suitable for the electron detector 80 of the present invention. In one embodiment, the detector 80 is a simple conductor. The conductor detector can be driven by a low-voltage differential signaling pin pair, which in turn drives traces on a circuit board associated with the switch 68. Further, additional electron emitters can be employed as detectors, where one emitter may use its electron beam to control the electron beam of another emitter. This allows complex circuits to be created in a manner that is similar to how transistors control other transistors to create circuits.

Semi conductor which can take the form of lasers can be employed in the detectors 80. E-beam pumped lasers create laser beam outputs in response to an electron beam input, as is understood in the art. E-beam pumped lasers may have other advantages, including eliminating the need for electrical interconnects necessary in electronic lasers. This allows for much higher modulation rates because it is typically difficult to run electronic interconnects at high speeds because of problems such as cross-talk and reflection.

Phosphors produce non-coherent light when struck by electrons. Thus, phosphors can be used in connection with the detectors 80 to generate optical signals from the electron beam 82. Active semiconductor-based targets can also be employed in the detectors 80, where the strength of the beam may be very low, and the semiconductor-based target can be used to amplify the signal created by the beam 82 when it strikes a conductor.

Further, dynodes can be employed to cause the electron beams 82 to turn around sharp corners, and can be used as amplifiers. Also, the detectors 80 can drive vertical cavity surface-emitting lasers (VCSELs). VCSELs are lasers that can be fabricated in arrays on semiconductor wafers. It is often desirable to use a very small VCSEL pitch, on the order of tens of microns, between each VCSEL in order to decrease the amount of wasted silicon between the VCSELs, and thereby decrease the cost of the VCSEL array. However, optical fibers in optical fiber ribbon cables typically have a 250 micron pitch. This makes it impossible to directly bond the fiber to the VCSELs. To remedy this, a planer waveguide may be used to "fan out" the signals from the small-pitch at VCSELs to the large pitch fiber bundle.

Another type of laser that can be used as the detector 80 is a sub-threshold laser. A sub-threshold laser is held by a DC bias to a voltage just below the laser's lazing threshold. The electron beam 82 then need only add a small amount of current in order to push the laser beyond its lazing threshold to generate the laser beam. This reduces beam current requirements.

As shown in FIG. 2, the arrays 70 and 76 are plane arrays that are facing each other at approximately 1 cm apart. In alternate embodiments, the planes defining the arrays may be "dished" to reduce deflection angles. Other designs may arrange the arrays 70 and 76 in various configurations, including positioning the detectors 80 and the emitters 72 in pairs.

Figure 3:
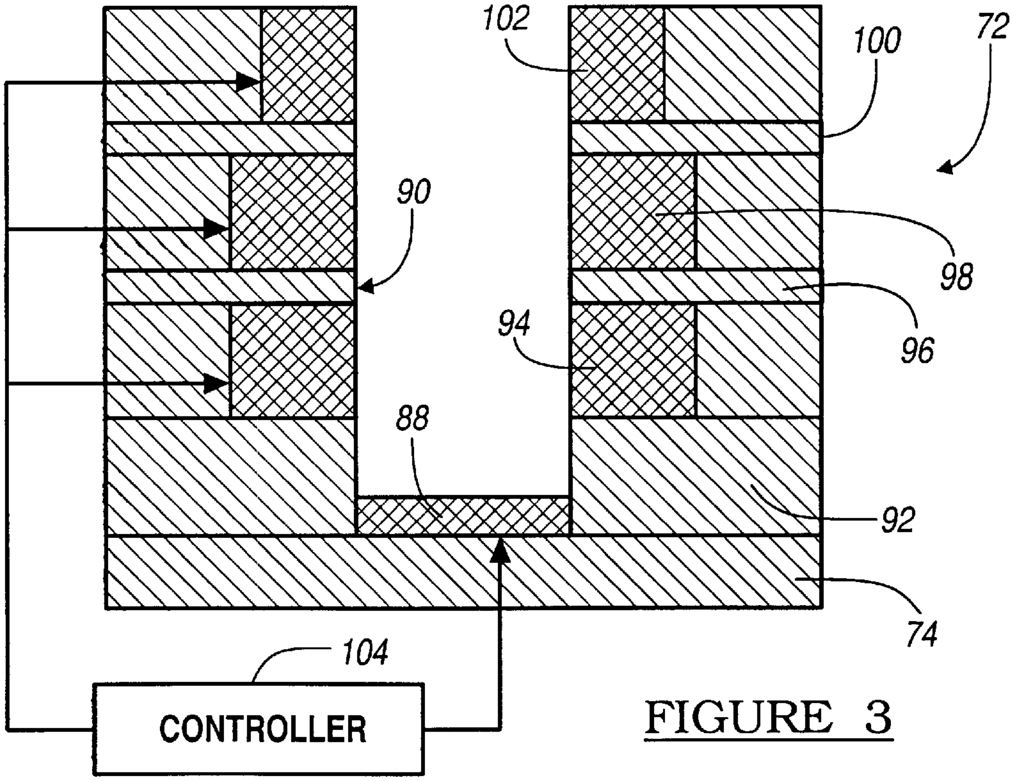
FIG. 3 is a cross-sectional view of one of the emitters in the switch shown in FIG. 2.

FIG. 3 is a cross-sectional view of one of the emitters 72 showing the various components therein, according to the invention. Particularly, the emitter 72 includes a cathode 88 deposited on the substrate 74 at the end of an open channel 90. The cathode 88 is surrounded by a first insulator layer 92 on which is formed an annular modulating electrode 94. The terms modulating electrode and gate or gate structure will be used interchangeably throughout this discussion. A second insulator layer 96 is formed on the modulating electrode 94, and an annular focusing and/or accelerating electrode 98 is formed on the insulator layer 96. A third insulator layer 100 is formed on the focusing electrode 98, and an annular aiming anode 102 is formed on the insulator layer 100. In an alternate embodiment, the position of the electrodes 94 and 98 can be reversed. The various layers discussed herein can be deposited and patterned by any suitable semiconductor fabrication technique.

As described herein, the emitter 72 receives an electrical or optical input signal that is converted by the cathode 88 into a beam of electrons. In one embodiment, the cathode 88 has a thickness of between 5 and 70 microns. If the cathode 88 is a hot cathode, it may be difficult to obtain high modulation rates because of the size of the cathode 88 and the relatively large distance between the cathode 88 and the modulating electrode 94 (gate). For those applications where the input signal is electrical (RF), the cathodes 88 can be cold cathodes. Cold cathodes are typically smaller than hot cathodes, and they do not generate significant heat. However, unlike photocathodes, it is difficult to modulate a cold cathode directly. Modulation is provided for a cold cathode by the modulating electrode 94 or a related gate structure.

Electrons generated by the cathode 88 are directed down the channel 90 and out of the emitter 72. The modulating electrode 94 generates a controllable electric field within the channel 90 that pulses (periodically inhibits) the electron beam 82 so as to impart a modulation thereon. The modulation of the electrons provides the data in the beam 82. The focusing electrode 98 provides an electric field that gathers and focuses the modulated electrons to allow them to be directed out of the channel 90. Additionally, the focusing electrode 98 accelerates the electron beam 82 to the desired speed. The aiming anode 102 generates a controlled electric field that causes the electron beam 82 to be directed to the desired detector 80. According to the invention, the aiming anode 102 can direct the electron beam 82 from the emitter 72 to any of the detectors 80

In this embodiment, the modulating electrode 94, the focusing electrode 98 and the aiming anode 102 are annular members. However, this is by way of non-limiting example, in that other shaped electrodes can be provided suitable for the purposes discussed herein, as would be appreciated by those skilled in the art.

A controller 104 is provided to control the voltage signals applied to the modulating electrode 94, the focusing electrode 98 and the aiming anode 102. The controller 104 acts to impart the desired data onto the electron beam 82 through the modulation function, causes the speed of the electron beam 82 to be a certain desirable speed, and causes the aiming anode 102 to direct the electron beam 82 to the desired detector 80. The controller 104 would control several of the emitters 72 at a time, and possibly all of them. The controller 104 could be fabricated on the same wafer as the emitter array 70, or could be external thereto. By distributing the various controllers associated with the switch 12, the addressing requirements can be decreased. In one application, it may be useful to employ an ASIC within the vacuum enclosure to control the aiming anode 102. This would lead to a lesser number of interconnects extending through the enclosure.

Using the modulating electrode 94 as a method of modulating an electron beam has certain drawbacks. For example, each emitter 72 would require a separate amplifier because the turn-off voltage for cold cathodes is typically high, often above 5V. Photodiodes typically produce much lower voltages, sometimes as low as 5–6 mV. However, this is still far too low to modulate a cathode directly.

Various types of other modulation techniques can be employed. For example, the switch design can take advantage of the scaling laws of the device. Particularly, as the distance between the emitters 72 decreases, and the emitters 72 are moved closer together, the required beam throw decreases. Decreasing the beam throw decreases the spot size of the beam, because the beam travels a shorter distance before striking the detector 80. Decreasing the beam spot size, decreases the amount of deflection necessary to blank the beam off of the detector 80. Thus, decreasing the amount of deflection, decreases the voltage requirement.

Alternately, a slow wave modulator can be employed. A slow wave modulator is a transmission line that is shaped such that the linear velocity of a signal traveling over the transmission line is equal to the velocity of the electrons that are traveling near the transmission line. This technique allows for the use of a very long modulating anode that operates at very high speeds. The longer the anode, the lower the voltage needed to produce a given deflection. Further, a large number of electron guns can be used per emitter 72, where all of the guns are targeted at a single detector 80. Decreasing the beam current decreases the spot size of the beams, and therefore decreases the required modulation voltage. However, in many applications, a minimum beam current is needed in order to produce a useable signal on the output of the switch 12. Therefore, a large number of very low current beams may be combined at a single detector 80 to produce the necessary output current while still allowing low deflection voltages per beam.

As an alternative to modulating the electron beam 82 with a gate or the modulating electrode 94, the beam 82 could be modulated by a technique known as blanking. In blanking, the aiming anode 102 causes the electron beam 82 from a particular emitter 72 to impinge a particular detector 80 at one time and be aimed away from the detector 80 at another time. The beam 82 is steered off of the detector 80 in order to change the voltage received by the detector 80. The communications signal can be intermixed with the aiming signal on the aiming anode 102 to stear the beam 82 on or off the detector 80. This allows a steady state signal to be applied to the cathode 88. Blanking allows greater modulation rates to be achieved by directly modulating the cathode 88 with a gate electrode.

Figure 4:
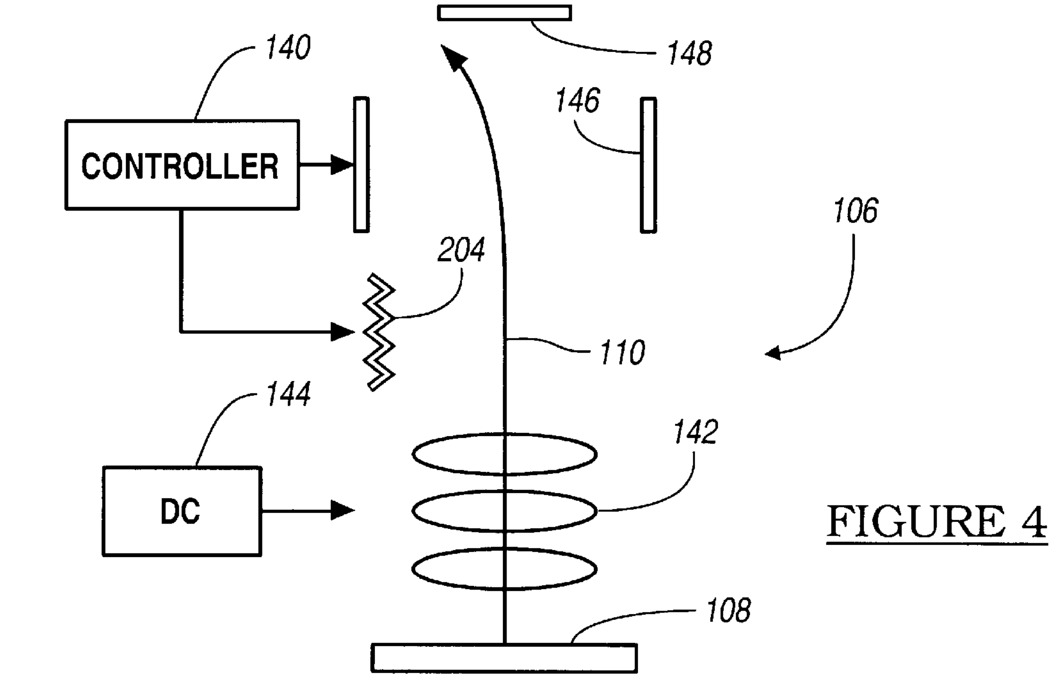
FIG. 4 is a plan view of an emitter employing a blanking modulation technique, according to an embodiment of the present invention.

FIG. 4 is a plan view of an emitter 106 showing the blanking modulation technique of the invention. The emitter 106 includes a cathode 108 that emits an electron beam 110 consistent with the discussion herein. A series of focusing and accelerating electrodes 142 collect, accelerate, focus and steer the beam 110, as is discussed above. The electrodes 142 are controlled by a controller 144 that applies a suitable DC voltage thereto. The emitter 106 additionally depicts a meanderline electrode 204 which functions to slow the velocity of signals traveling on the meanderline electrode for correlating the speed of the meanderline electrode's signal to the speed of the electron beam. The structure of a meanderline electrode is described in U.S. Pat. No. 4,207,492. A deflection electrode 146 is positioned between the cathode 108 and a target 148. A controller 140 applies a modulating voltage signal to the electrode 146 so that the beam 110 is directed to the target 148 or is deflected away from the target 148 so as to provide the blanking function. Particularly, the modulating signal applied to the electrode 146 causes the electron beam 110 to be repelled.

It is important that the signal propagation time from any emitter 72 to any detector 80 is the same. Because the distance between a certain emitter 72 and the detectors 80 is slightly different, there will be a small variation in the distance the electrons travel for different detectors 80. Varying the voltage on the focusing electrode 98 can compensate for this variation in distance. By applying a greater voltage to the focusing electrode 98 the velocity of the electrons is increased and their travel time is thus reduced. This technique may also be used to compensate for small differences in the lengths of the traces or fibers within the interconnects that lead to the switch 12.

In one embodiment, there are four aiming anodes 102 per channel 90 to provide steering of the electron beam in the up, down, left and right directions. Algorithms that provide beam steering of the type discussed herein are known in the art, and any suitable algorithm can be used. In one embodiment, it may be desirable to implement an intelligent beam steering algorithm that compensates for nearby magnetic fields and also compensates for manufacturing defects. One implementation of such an algorithm would be to have the controller 104 create a two-dimensional table in memory. One dimension would be for each of the cathodes 88 that is controlled by the controller 104, and the other dimension would be for various output ports. Each cell of the table would store a value that indicates the amount of voltage needed for each of the aiming anodes 102 to cause the beam 82 to strike the desired detector 80. The controller 104 would have an initialization mode during which the controller 104 populates the tables on an emitter-by-emitter and detector-by-detector basis.

One implementation of the algorithm would use a technique that is commonly used in computer graphics known as spatial decomposition. Spatial decomposition is based on two-dimensional grid. However, spatial decomposition allows the sizes of the cells in the grid to vary. Varying grid cell sizes in this way allows regions of the table that are more regular and contain fewer distinct features to be represented with larger grid cells than regions of space that are less regular and contain many distinct features. If large portions of the table are regular, then this allows the table to occupy significantly less memory.

In one embodiment, the spatial decomposition algorithm could have the following steps. First, an emitter 72 in the center of the emitter array 70 is tested. It is then assumed that all of the emitters 72 in the array 70 behave the same as the tested emitter. This allows the entire table to initially be represented as a single large cell. Testing the central emitter in each of the four quadrants of the original tested emitter tests the assumption of the previous step. If any of the emitters 72 behaves differently than the central emitter 72, then the initial cell is subdivided into four smaller cells. The previous steps are recursively performed for each of the four new cells.

In one embodiment, a digital-to-analog converter (not shown) is required to control the aiming anodes 102. The speed of the digital-to-analog converter will be the main determinant of the switching speed of the switch 12. Resister arrays may be used as a faster alternative to the digital-to-analog converter. However, because a very large number of resistors would be required, this approach may only be viable for a switch having a relatively small number of output ports.

Because the aiming electrodes 102 have an annular shape, they will not produce deflection angles that are precisely proportionate to voltage, as would be necessary in a display application. However, the output ports in the detector array 76 may be patterned to compensate for the distortion. It is envisioned that the aiming anodes 102 can be designed to produce deflection angles proportional to the applied voltage.

In another embodiment of the present invention, the free space switch 12 provides low-voltage differential signaling by using one set of aiming anodes for two separate emitters 72. The alternative is to convert the low-voltage differential signaling into a single signal on the input side of the switch 12, and then convert it back to a low-voltage differential signal on the output side. However, by allowing the low-voltage differential signaling pair to pass through without the conversion provides certain advantages, including removing the need for semiconductor-based low-voltage differential signaling drivers and allowing the switch 12 to operate at higher speeds than those allowed by typical semiconductors.

In some applications, the aiming anodes 102 will not be needed. In these applications, each emitter 72 operates as a simple on/off switch that is similar to a vacuum tube or a transistor. These switches may be cascaded or combined in other ways to create digital logic circuits or analog circuits. Alternatively, such a device could be used as a parallel driver or amplifier. One application for such a device would be in driving optical modulators at high speeds. Another application would be for driving copper loops in access networks.

An alternative to a standard electronic transistor may be created using a blanking modulation structure, similar to the emitter 106 above, according to the invention. In that embodiment, the device is a single port device, where the electron beam is switched on and off the target. The result is a switch/amplifier that has a very high switching speed, limited only by the maximum rate that a modulation signal is sent to the modulator, which may be on the order of many hundreds of GHz. The modulator can take the form of the meanderline electrode 204 as shown in FIG. 4. Further, the single port switch will provide efficient amplification because free space has less loss than semiconductors. Also, the single port switch would have a high gain because a very weak input signal may be used to deflect a very powerful beam. Additionally, there is a low or no intermodulation distortion.

The switch 12 discussed above provides a number of significant advantages over other switches known in the art. The switch 12 provides virtually an unlimited input and output port count for a relatively small footprint. Each emitter 72 would only occupy a few microns on the substrate 74. The switch 12 uses a minimal amount of power regardless of the number of emitters 72. The entire switch 12 is a single stage device that doesn't require intra-switch interconnects. Each emitter 72 has virtually an unlimited throughput allowing the emitters 72 to be driven beyond 40 Gbps. The switch 12 is capable of picosecond switching speeds, and thus doesn't require buffering.

The switch cathode discussed herein also has application as an amplifier. By driving the cathode 88 with a suitable voltage, the electron beam 82 generated by the cathode 88 provides an amplification of the input signal at the detectors 80. Alternately, switch 12 can include a single cathode 88 that selectively provides an output signal to any of the plurality of the detectors 80. Such an application would be available where a signal from a single source could be switched to any of a plurality of destinations.

A major design challenge with the vacuum devices is the problem of getting signals into and out of the device. This is commonly done with vacuum feed-throughs, which require a connector between the inside and the outside of the vacuum chamber. An alternative solution is to have a plate of glass, ceramic or some other material that separates the vacuum chamber. Signals may then be sent from the inside of the chamber to the outside, or vice versa, as needed, by sending them over the plane of the separater. The signals may be electrical and travel over electrical conductors, or they may be optical and travel over optical waveguides.

Figure 5:
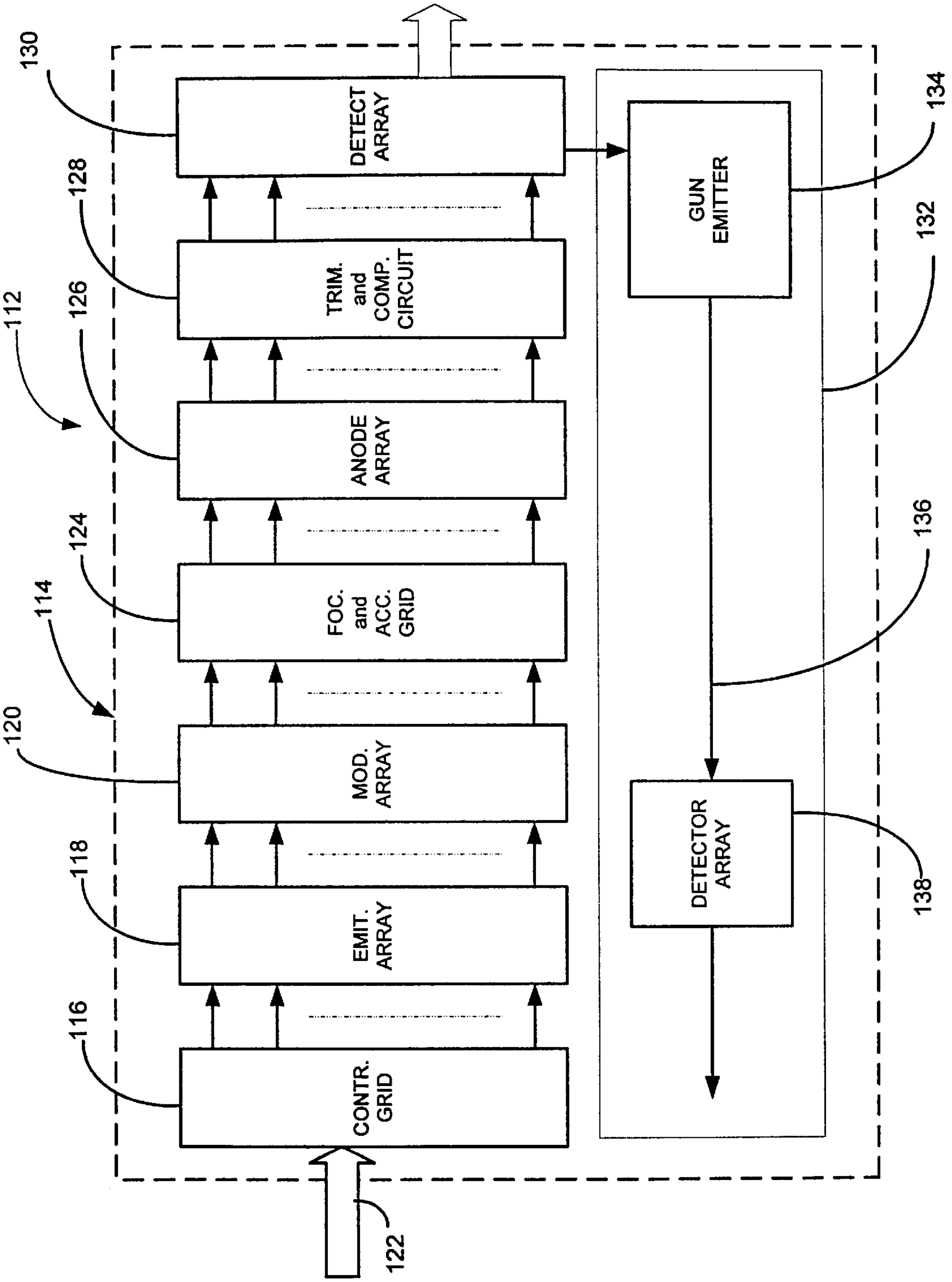
FIG. 5 is a block diagram showing the operation of the switch shown in FIG. 1.

FIG. 5 is a general block diagram of a switching system 112 depicting the operation of the switch 12, discussed above. The switching system 112 is provided within a vacuum enclosure 114 to enhance the propagation of the free space electrons. A cathode-controlled grid 116 generates a plurality of control signals to each of the cathodes in an emitter array 118. The emitter array 118 emits the free space electrons therefrom, as discussed above, and a modulating array 120 modulates the electron beams based on the data received on a data input line 122. The modulated electron beams then propagate through a focusing and accelerating grid 124 that collects and accelerates the electron beams. In some designs, the modulating array 120 will be after the focusing and accelerating grid 124. The electron beams are then directed by aiming anodes 126, in the manner as discussed above, through a trimming and compensation circuit 128 to a receiver array 130. The trimming and compensation circuit 128 compensates for local magnetic fields, as is understood in the art. The receiver array 130 includes the various detectors that convert the electron beams to electrical signals or optical signals for outputting on the various optical output fibers. The control grid 116 employs standard switch control components to analyze optical packet data to determine the target location at the receiver array 130.

In an alternate embodiment, a beam return system 132 is employed to transmit the switched electron beams from the receiver array 130 back through the switching system 112 so that the input and output ports of the switching system 112 are at the same end. This provides a more desirably configured system for some applications. To perform this function, the electron beams received by the receiver array 130 are used to excite the cathodes in a gun emitter 134. The gun emitter 134 transmits electron beams 136 back in the opposite direction that are detected by another receiver array 138.

Figure 6:
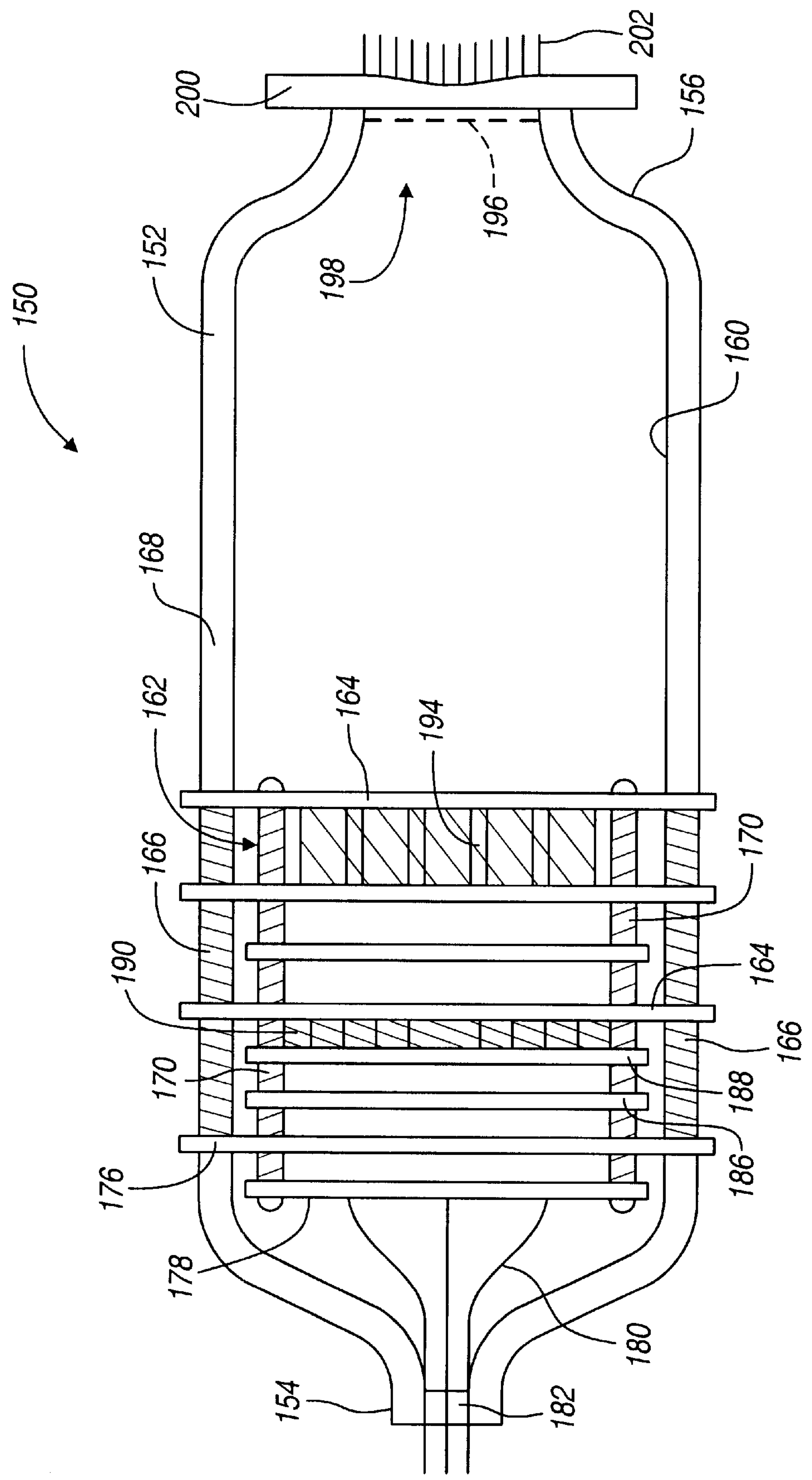
FIG. 6 is a cross-sectional view of a free space electron switch within a vacuum enclosure, according to another embodiment of the present invention.

FIG. 6 is a cross-sectional view of a free space switch 150, according to another embodiment of the present invention. The switch 150 includes a cylindrical glass tube 152 including a formed input end 154 and a formed output end 156, as shown. The glass tube 152 defines an internal chamber 160 enclosing the components of the switch 150 discussed below in a vacuum environment. The switch 150 includes a metal support structure 162 having a plurality of spaced apart rings 164 separated by ceramic annular members 166 formed in a wall 168 of the tube 152. Further, the support structure 162 includes internal ceramic annular members 170 between the rings 164, as shown.

In this embodiment, a cathode plate array 176 is mounted to the wall 168 at the input 154 end of the tube 152, and includes a plurality of hot cathode emitters (not shown). A cathode heater plate 178 is provided proximate the input end 154 within the chamber 160, and receives electrical signals on lines 180 extending through a connector 182 in the formed end 154, as shown. The cathode heater plate 178 heats the various cathode emitters in the cathode plate array 176 to generate the electron beams.

The beams generated by the emitters in the cathode plate 176 are directed through a pair of aperture plates 186 and 188 having apertures aligned with the emitters. The plates 186 and 188 are spaced from the cathode plate array 176 and each other by the members 170. The electron beams that are directed through the aperture plates 186 and 188 are focused and accelerated by a focusing and accelerator grid 190 mounted between the plate 188 and a support ring 164, as shown. The electron beams are accelerated through the chamber 160, and are aimed and directed by a grid of aiming anodes 194. The focused, accelerated and aimed electron beams are directed to a particular receiver 196 in a receiver array 198 proximate the formed end 156. A connector plate 200 closes off the formed end 156 of the tube 152. The connector plate 200 includes a plurality of output lines 202 that transfer the received electron beams to the appropriate output circuitry (not shown).

As discussed above, a photocathode is a device that emits electrons in response to incident photons. Photocathodes are typically used in imaging applications, such as night vision detection. Photocathodes have a very fast response time, on the order of femotoseconds, which allows the creation of very high-speed communications systems operating at 40 Gbps or higher. The free space electron switch of the invention could be implemented in various communications applications using a transmission photocathode, which emits electrons opposite the side of the device that absorbs the photons. However, a standard photocathode that emits electrons on the same side that absorbs the photons may also be used.

Because electrons that are emitted over a wide area may be focused electrostatically, a photocathode-based optical receiver could potentially simplify the coupling of an optical fiber to the receiver. For example, it is conceivable that an entire fiber bundle (not shown) could illuminate a single, wide-area photocathode. A focusing and accelerating grid behind the photocathode would collect and focus electrons into individual beams, regardless of the exact placement of the fiber bundle relative to the focusing and accelerating grid. Since the fiber core is many times smaller than the fiber cladding, cross-talk should be minimal in the switch because the focusing and accelerating electrodes would be placed at a spacing that is roughly the size of the fiber core.

Figure 7:
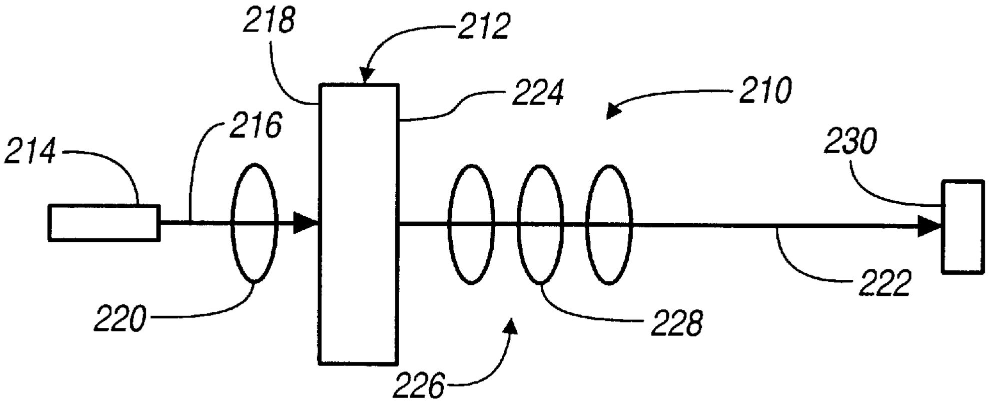
FIG. 7 is a block plan view of a free space electron switch employing a single fiber input and a photocathode, according to an embodiment of the present invention.

FIG. 7 is a block plan view of a free space electron switch device 210, according to another embodiment of the present invention, that employs a photocathode 212. An input optical fiber 214 directs an optical beam 216 onto one surface 218 of the photocathode 212, as shown. In one embodiment, an optical lens 220 is provided to focus the optical beam 216 onto the photocathode 212 at the desired location. In response to the received photons, the photocathode 212 emits an electron beam 222 from an opposite side 224 of the photocathode 212, as shown. A series 226 of focusing and accelerating electrodes 228 are positioned adjacent the path of the electron beam 222 to focus and accelerate the electrons in the beam 222.

The data that was originally encoded on the optical beam 216 is now encoded on the electron beam 222 as variations in intensity of the beam 222. Various beam focusing schemes known in the art that are suitable for the purposes described herein may be used. For example, the electrons in the beam 222 may converge on a single point, or alternately they may be made to travel in a laminar flow. A target 230 that converts the beam 222 to a representative electric signal or optical signal receives the electron beam 222.

Figure 8:
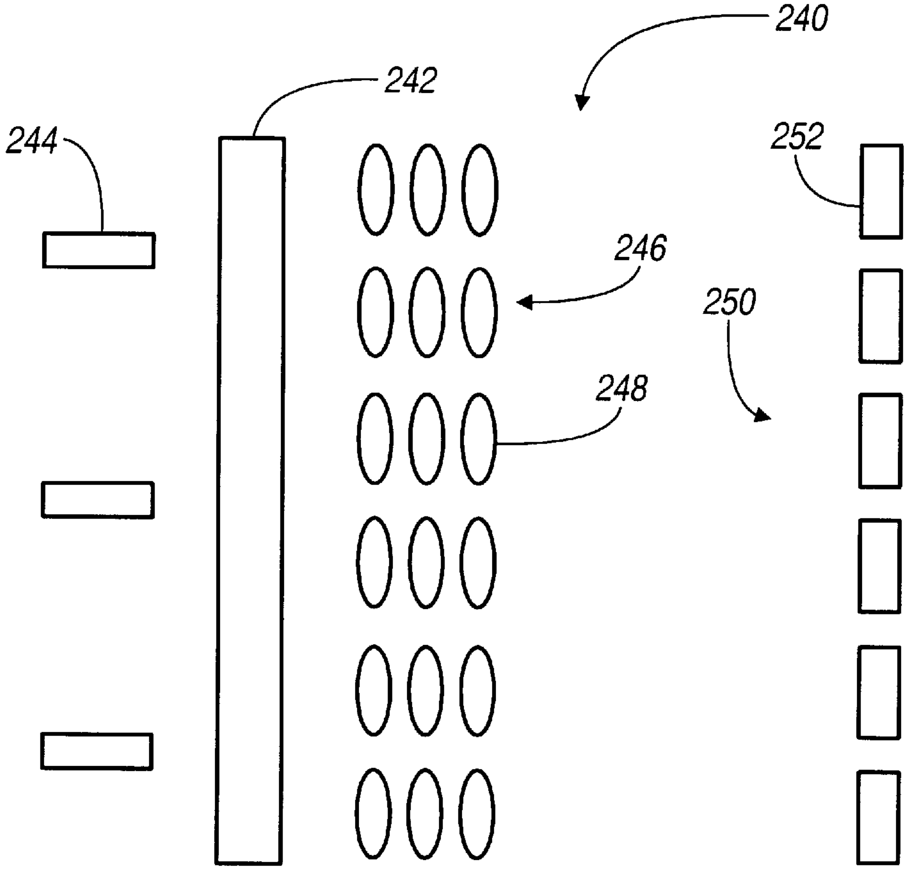
FIG. 8 is a block plan view of a free space electron switch employing a fiber bundle input and a single photocathode, according to an embodiment of the invention.

FIG. 8 is a block plan view of a free space electron switch device 240 that expands on the switch device 210. A photocathode 242 is provided that has a relatively large surface area, and receives optical beams from a plurality of input fibers 244. In this example, the fibers 244 are spaced apart a predetermined distance, but are intended to represent a plurality of fibers wrapped in a bundle. Electron beams are emitted from an opposite side of the photocathode 242 from the input fibers 244. A grid 246 of focusing and accelerating conductors 248 is provided adjacent that side of the photocathode 242 to focus and steer the electron beams. The focusing and accelerating grid 246 causes the plurality of electron beams to impinge an array 250 of targets 252.

Figure 9:
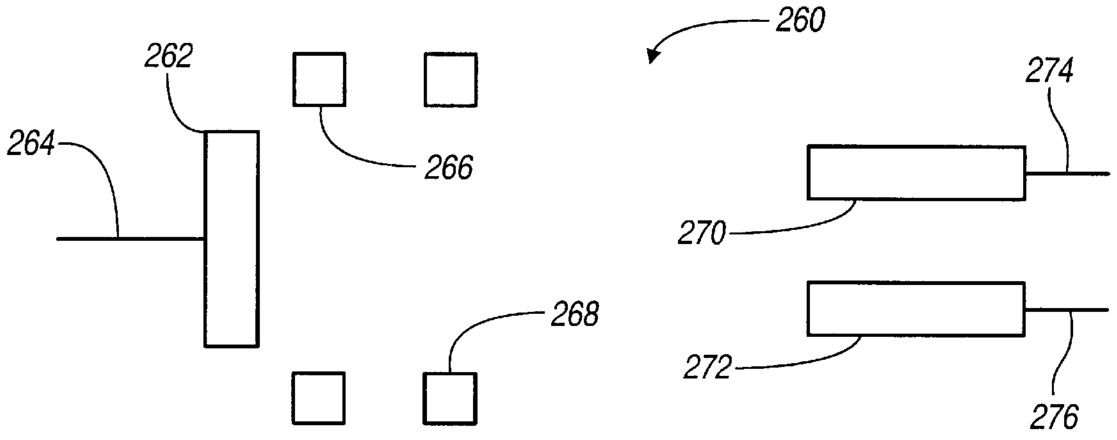
FIG. 9 is a block plan view of a free space electron switch employing e-beam pumped laser receivers, according to an embodiment of the present invention.

FIG. 9 is a block plan view of a free space electron switch device 260, according to another embodiment of the present invention. In this embodiment, the cathode is a photocathode 262, and is represented as a single emitter. However, as discussed above, the photocathode 262 may be part of an array of photocathodes suitable for the type of switch being discussed herein. The photocathode 262 receives an optical signal, from, for example, an optical fiber 264, and converts the optical signal to a stream of free space electrons. In this embodiment, a modulating electrode is not used, but could be provided in alternate embodiments.

A pair of annular focusing and accelerating electrodes 266 and 268 are provided adjacent the photocathode 262, as shown. The electrodes 266 and 268 provide an electromagnetic and/or electrostatic field that acts to steer, accelerate, decelerate or block the free space electrons emitted from the photocathode 262. The target or receivers in this embodiment are a pair of e-beam pumped lasers 270 and 272 that receive the free space electron beam from the photocathode 262, and generate an optical output beam on optical fibers 274 and 276, respectively, as is well understood in the art. The operation of e-beam pumped lasers is well known in the art, and need not be specifically discussed herein.

The switch device 260 is a 1×2 switch in that the single photocathode 262 is provided to direct the beam of electrons to one of a pair of e-beam pumped lasers 270 and 272. The switch device 260 can thus be used as a modern type transistor, where the electron beam is first directed to one of the lasers 270 or 272 and then switched therefrom. Therefore, the electrons do not propagate through a semiconductor and thus their speed is optimized. The switch device 260 can be miniaturized and integrated with large-scale circuits on silicon wafers.

A major challenge in the design of many electronic systems that employ back planes is minimizing the back plane trace density. These systems typically require more traces on the back plane than can be easily obtained using standard trace lithography and routing techniques. A common solution is to multiplex a large amount of data into a single high-speed signal before the data is sent over the back plane, and then demultiplex the signal on the other side of the back plane. A multiplexer is a device that takes data from a relative low-speed parallel bus and inserts it onto a high-speed serial line. A demultiplexer is a device that takes data from a high-speed serial data line, and translates the signal onto a lower-speed parallel bus. Typical multiplexing and demultiplexing techniques involve the use of high-speed digital serial lines over low-voltage differential signal trace pairs. Known high-speed demultiplexers operating at 10 Gbps–40 Gbps require the use of very expensive and exotic technologies and suffer from extremely high power consumption. The free space electron switch of the present invention can be used as a demultiplexer and a multiplexer to provide less complex devices.

Figure 10:
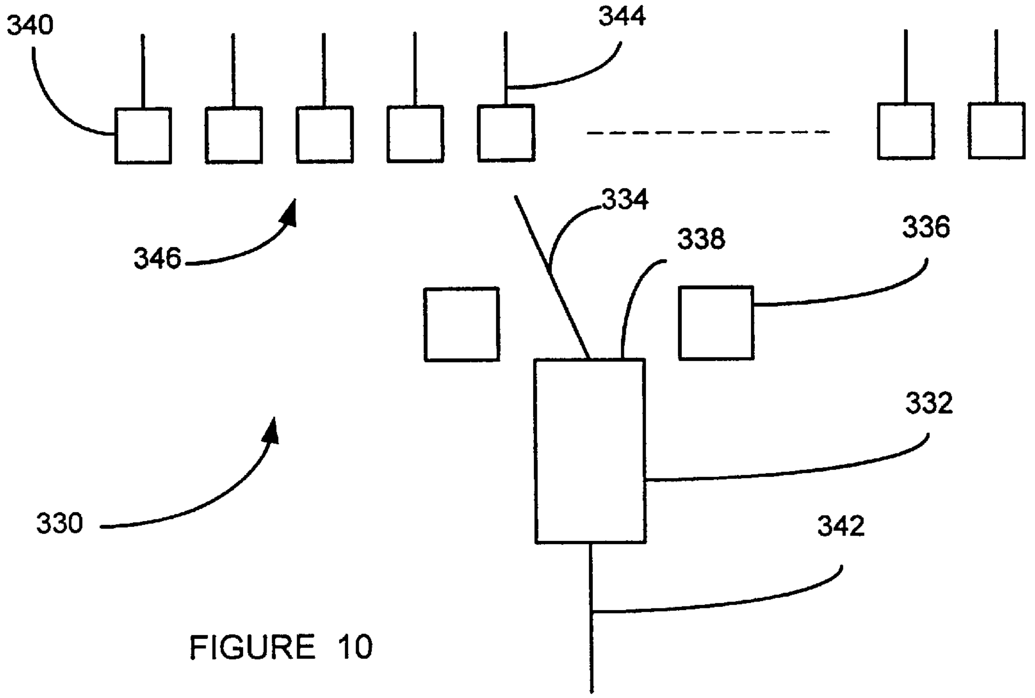
FIG. 10 is a block plan view of a multiplexer based on the teachings of a free space electron switch of the invention.

FIG. 10 is a block plan view of a demultiplexer 330 that operates on the principals of the free space electron switch of the present invention. The demultiplexer 330 includes an electron gun 332 that emits a beam of free space electrons 334. The electron gun 332 acts as the emitters discussed above, and thus includes a cathode, such as a photocathode, hot cathode or cold cathode. An annular aiming anode 336 is provide proximate an output end 338 of the gun 330 to steer the beam 334.

A plurality of electron detectors 340 are provided in an array 346 spaced from the gun 332. In one embodiment, there are 256 of the detectors 340 arranged in a two-dimensional array. The electron detectors 340 can be any electron detector suitable for the purposes described herein that is able to receive an electron beam and convert it to a representative electrical or optical signal.

In one non-limiting example, the electron beam 334 generated by the electron gun 332 is modulated by a 40 Gbps input signal on a serial input line 342. As it is modulated, the electron gun 332 will be scanned across the detectors 340, crossing each detector 340 160 million times per second. This will result in the 40 Gpbs serial input signal being demultiplexed into 160 MHz, 256-bit parallel buses on output lines 344. Because the gun 332 and the detector array 346 would be small and compact, a large number of the multiplexers 330 could be integrated onto a single chip.

Figure 11:
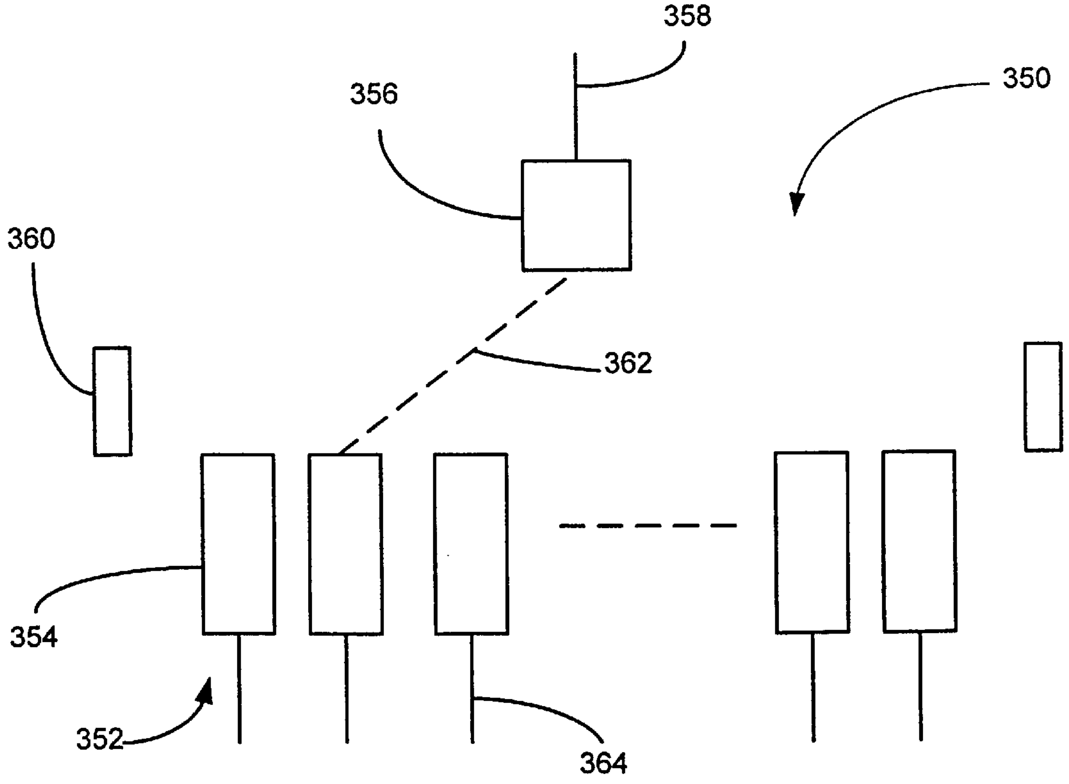
FIG. 11 is a block plan view of a demultiplexer based on the teachings of a free space electron switch of the invention.

FIG. 11 is a block plan view of a multiplexer 350 that operates on the principals of the free space electron switch of the present invention. The multiplexer 350 includes an array 352 of steerable electron guns 354, where the electron guns 354 are emitters employing cathodes of the type discussed herein. A single electron detector 356 facing the electron guns 354 drives a serial output bus 358. A single set of aiming anodes 360 are employed to steer the several electron beams 362 emitted from the guns 354 to the detector 356.

In this non-limiting example, there are 256 electron guns 354, where each gun 354 is driven by one bit of a 160 MHz, 256-bit input parallel bus 364. For each clock cycle of the parallel bus 364, the beams 362 from the electron guns 354 would be scanned past the detector 356 so that the gun 354 illuminates the detector 356 for a brief period during the clock cycle. Electron pulses from the guns 354 would then be output on the output bus 358 at 40 Gbps.

In a more mechanically simple alternate embodiment or approach, the aiming anodes 360 are eliminated, and each of the guns 354 are pointed directly at the detector 356. Each gun 354 would be modulated with a different voltage. Since the voltage of the gun 354 determines the speed at which the electrons are transmitted across the gap to the detector 356, control of the cathode voltage could be used to set the time for each clock cycle that the signal from each bit is inserted into the serial output stream. Electron guns that are connected to lower-numbered bits from the input parallel bus 364 would use higher voltages than the electron guns that are connected to higher-numbered bits.

According to the invention, a technique for serializing data using a digital-to-analog converter is provided. For example, an eight-bit input bus could be used as the input signal to a D/A converter, resulting in an output voltage that contains all of the information that was in the original binary eight bits. However, that voltage can be sent over a single wire rather than eight wires. This results in eight bits being serialized over a single signal line. Furthermore, this serialization is obtained without an increase in the data rate of the serial line.

Digital serializers operate by using much higher data rates than the input signals. This greatly complicates the electrical design of the back plane and back plane connectors, and greatly increases power consumption since the circuitry necessary to run at those speeds tends to consume much more power than slower circuits. It also causes existing back plane technology to run into fundamental limits in terms of trace modulation rate, cross-talk and reflection.

A serializer, according to the invention, allows the use of lower trace modulation frequencies in order to obtain the same throughput. For example, if four digital bits are encoded into each analog cycle, the modulation rate of the serial line needs to be one-fourth as high as the equivalent digital serial line. Further, rise and fall times are longer with an analog signal compared to a digital signal at the same frequency. This reduces cross-talk, signal loss and electromagnetic radiation. The serializer of the present invention can be used in any application where serializers and deserializers are currently being used. Besides back plane transceivers, another application in which the serializer would be highly suited is laser drivers for optical communications. In fact, drivers are an ideal application because factors such as cross-talk and loss that could degrade a highly differentiated analog signal do not exist in fiber.

The free space electron switch of the invention as described throughout this discussion can be employed at various locations in many types of communications network. Examples of various systems include asymmetric digital subscriber line (ADPCM), advanced intelligent network (AIN), advanced mobile phone network (AMPN), advanced traffic management system (ATMS), broadband switching system (BSS), connectionless broadband data service (CBDS), classless interdomain routing (CIR), commercial internet exchange (CIX), custom local access signaling service (CLASS), central office exchange (COE), digital-advanced mobile phone system (D-AMPS), digital communications channel (DCC), dataphone digital services (DDS), dialed number identification service (DNIS), digital subscriber line (DSL), digital subscriber line access multiplexer (DSLAM), data exchange interface (DXI), electronic key telephone system (EKTS), foreign exchange (FEX), fixed satellite system (FSS), internet packet exchange (IPX), integrated services digital network (ISDN), key telephone system (KTS), metropolitan area network (MAN), mobile satellite system (MSS), mobile traffic switching exchange (MTSX), private branch exchange (PBX), personal communications network (PCN), public switched telephone network (PSTN), twisted pair distributed data interface (TPDDI), universal mobile telecommunications system (UIFN), virtual local area network (VLAN), wide area telecommunication service (WATS), etc. The discussion below gives various examples of such uses, and is intended to be non-limiting. One of skill in the art would recognize from this discussion and from general knowledge of the art that the free space electron switch of the invention can be employed in various locations in various systems well beyond those disclosed herein.

Figure 12:
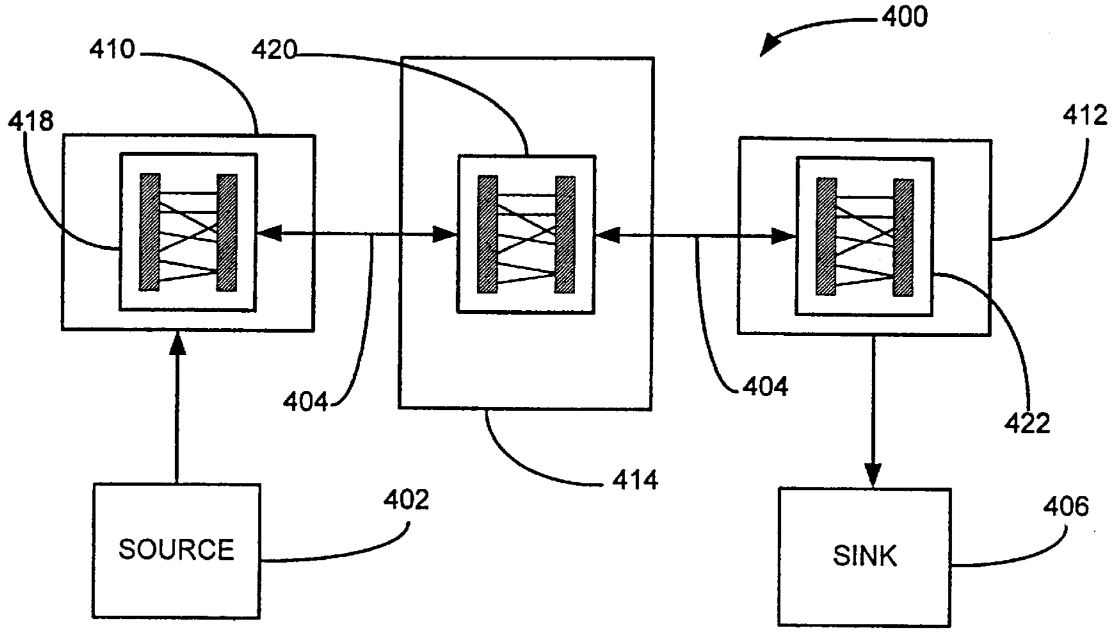
FIG. 12 is a block plan view of a network system employing a plurality of the free space electron switches of the present invention.

FIG. 12 is a block diagram of a network system 400 employing a free space electron switch in various locations in the system 400 as will be discussed below. In this example, a communications signal is transmitted from a source 402 over a series of communications links 404 to a sink 406. The source 402 can be any transmitter suitable for the purpose described herein, such as a telephone, data terminal, host computer system, video camera, etc. Likewise, the sink 406 can be any receiver suitable for the purposes described herein, such as a telephone, host computer system, video monitor, etc. Further, typically a source and a sink provide both transmit and receive functions, and thus each act as both a source and a sink.

The signals transmitted will be switched at edge offices 410 and 412, and a core or central office 414. An edge office is a switching station positioned at an edge of a network, and thus is typically a low capacity switching station. Central offices, sometimes referred to as tandem offices, are switching stations positioned at the center of the network, and thus employ high-capacity switches. A particular network may employ one or more than one central office.

The edge office 410 includes a free space electron switch 418 that switches the signal from the source 402 on the link 404 to a free space electron switch 420 in the central office 414. The central office 414 then switches the signal on the link 404 to a free space electron switch 422 in the edge office 412. The switch 422 directs the signal to the sink 404. The signal would include address bits so that the algorithms controlling the switches 418, 420 and 422 would know what office to direct the signal.

Figure 13:
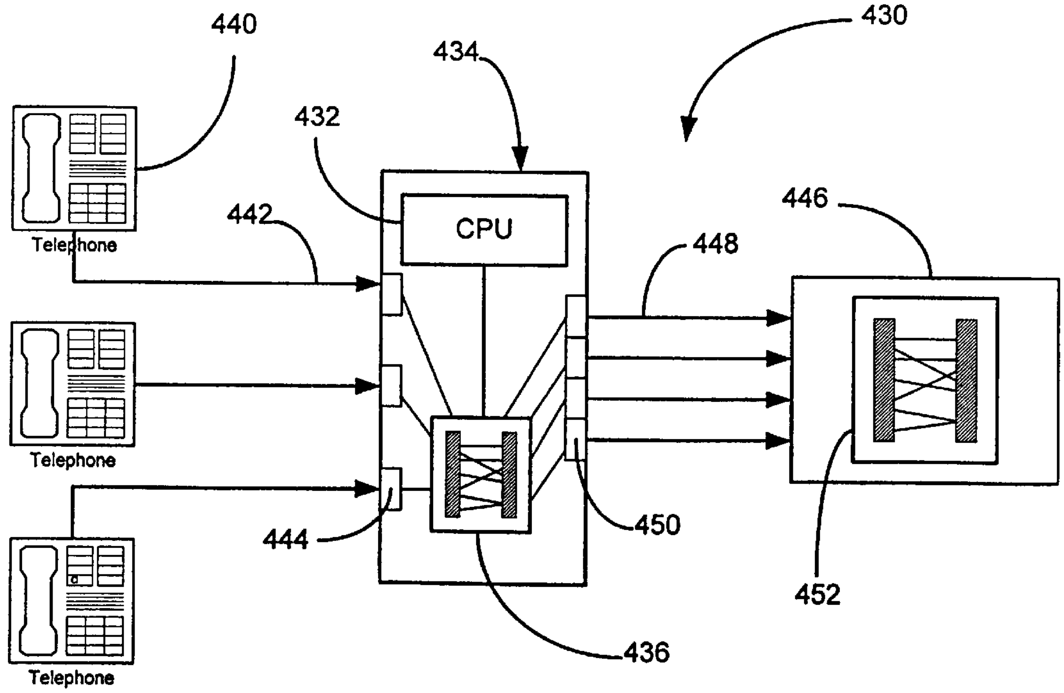
FIG. 13 is a block plan view of a private branch exchange (PBX) system employing a free space electron switch of the present invention.

FIG. 13 is a block plan view of a network system 430 depicting a private branch exchange (PBX). A PBX is a specialized computer system that includes a circuit-switching matrix for the primary purpose of conducting voice calls, but may also handle data signals. A common control, central processing unit (CPU) 432 within a central office 434 controls the operation of the PBX. The CPU 432 includes the software and associated hardware for controlling the calls being routed therethrough. The office 434 further includes a free space electron switch 436, according to the invention, that provides the signal routing for the CPU 432.

A plurality of telephones 440 at remote locations are in communication with the office 434 through station lines 442 and line interfaces 444. The line interfaces 444 are specialized circuit boards that serve to interface the PBX switch 436 to the station lines 442. Additionally, the office 434 is connected to another central office 446 through a plurality of PBX trunks 448 and trunk interfaces 450. The trunk interfaces 450 are specialized circuit boards that serve to interface the PBX switch 436 to the trunks 448. A free space electron switch 452, according to the invention, is provided in the central office 446 to provide signal routing therein. The central office 446 connects the PBX to other exchanges, such as an LEC exchange.

Figure 14:
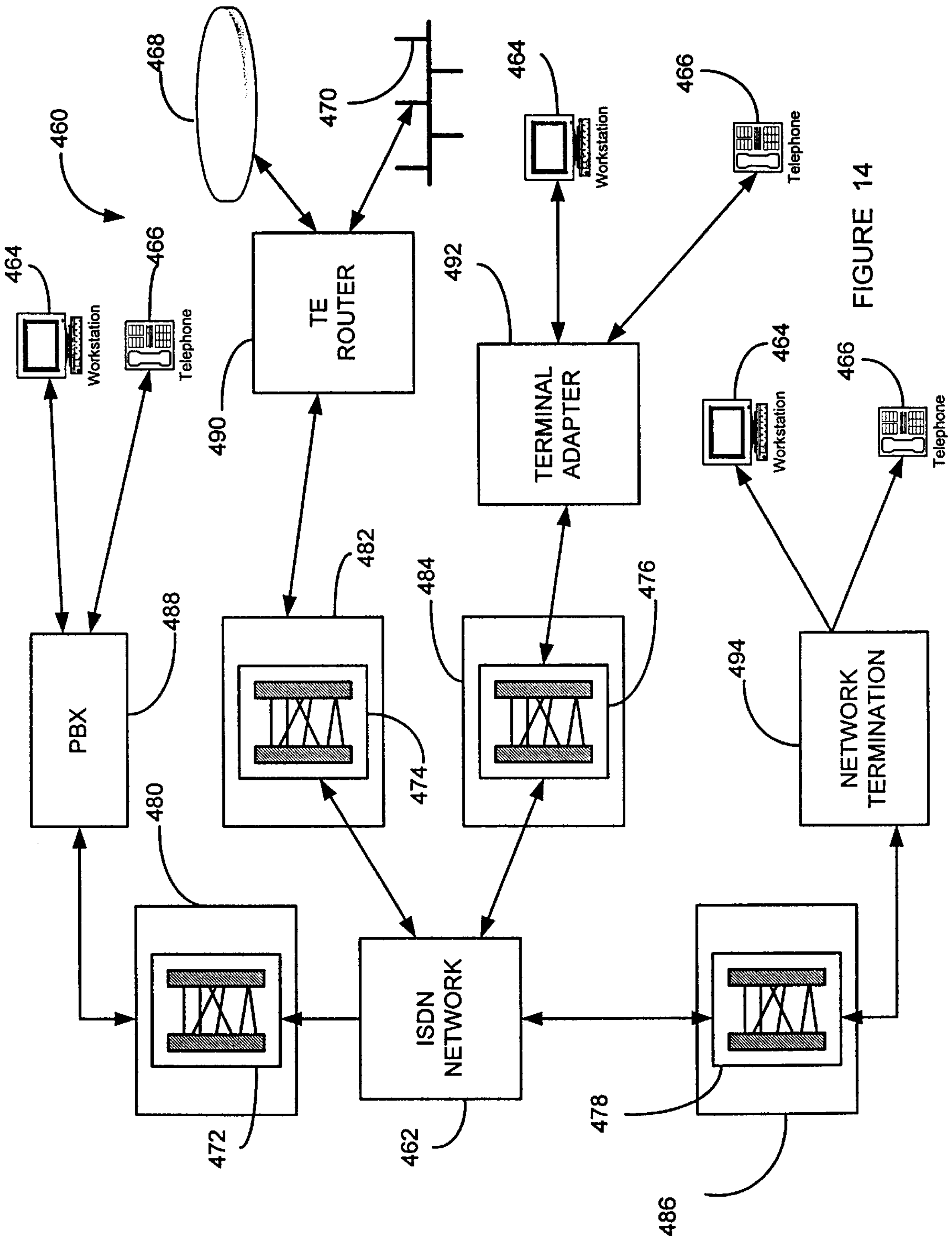
FIG. 14 is a block plan view of an ISDN telecommunications system employing a plurality of the free space electron switches of the present invention.

FIG. 14 is a block plan view of an integrated services digital network (ISDN) system 460 employing an ISDN 462. The ISDN 462 routes all types of signals, such as data, voice, video, etc., to and between various terminals 464, telephones 466, local area networks (LANs) 468, network buses 470, etc. The signals are routed to these devices by a series of free space electron switches 472, 474, 476 and 478 within various central offices 480, 482, 484 and 486, respectively, selectively positioned within the area associated with the system 460. The central offices 480–486 are in communication with other network components, including, but not limited to, terminal equipment (TE), such as a PBX 488 and a signal router 490, a terminal adapter (TA) 492, and a network termination (NT) 494. The terminal equipment includes function devices that connect a customer site to ISDN services. The terminal adapter 492 includes interface adapters for connecting one or more non-ISDN devices to the ISDN 462. The network termination 494 includes network termination devices that perform various functions, such as multiplexing, switching or ISDN concentration.

Figure 15:
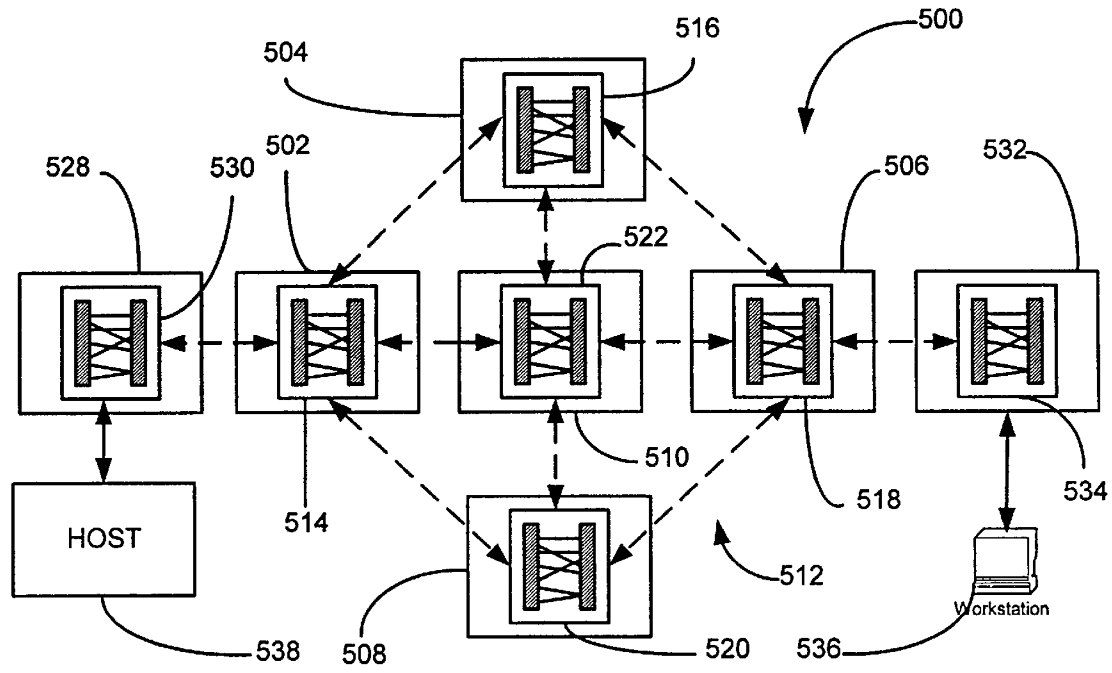
FIG. 15 is a block plan view of a packet switching network employing a plurality of the free space electron switches of the present invention.

FIG. 15 is a block diagram of a packet switching network 500, according to the invention. The packet switching network 500 routes packets of information through a series of interconnected packet nodes 502–510 that are part of a packet node array 512 without regard for whether the packets are part of a larger data stream. Thus, packet switching attempts to alleviate traffic congestion. Each node 502–510 includes a free space electron switch 514–522, respectively, according to the invention, for routing the packets therethrough.

The packet node 502 is connected to a central office 528 including a free space electron switch 530. Further, the packet node 506 is connected to a central office 532 including a free space electron switch 534. A terminal 536, such as a work station computer, is in signal communication with the central office 532 in its area. Additionally, an SDL host 538 is in signal communication with the central office 528 in its area. Data packets transmitted between from the terminal 536 and the host 538 are routed through the array 512 in an optimum manner to alleviate delays.

Figure 16:
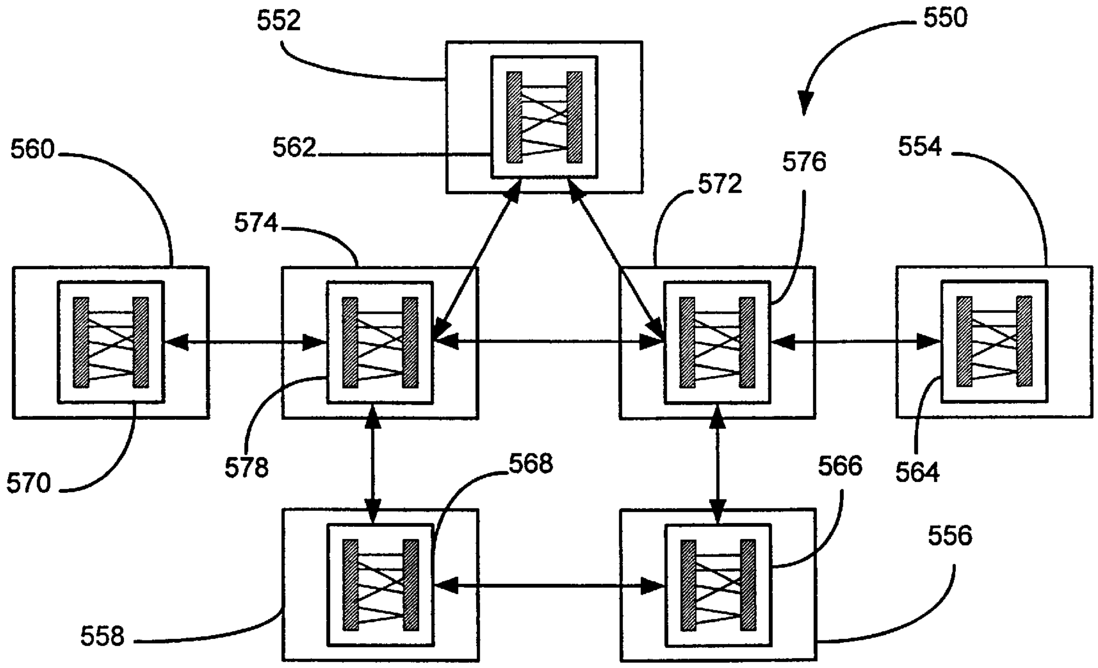
FIG. 16 is a block plan view of a local exchange carrier telecommunications system employing a plurality of the free space electron switches of the present invention.

FIG. 16 is a block plan view of a local exchange carrier system 550 that provides local telephone service, usually within the boundaries of a metropolitan area. The system 550 provides local voice service through a network of local loops and central offices that are connected either directly or through a tandem switch. The system 550 includes a series of outer end offices 552–560, each including a free space electron switch 562–570, respectively, of the invention. The end offices 552–560 are in signal communication either directly or through tandem offices 572 and 574, employing free space electron switches 576 or 578, respectively. As above, the switches 562–570, 576 and 578 provide signal routing between the offices 552–560, 572 and 574.

Figure 17:
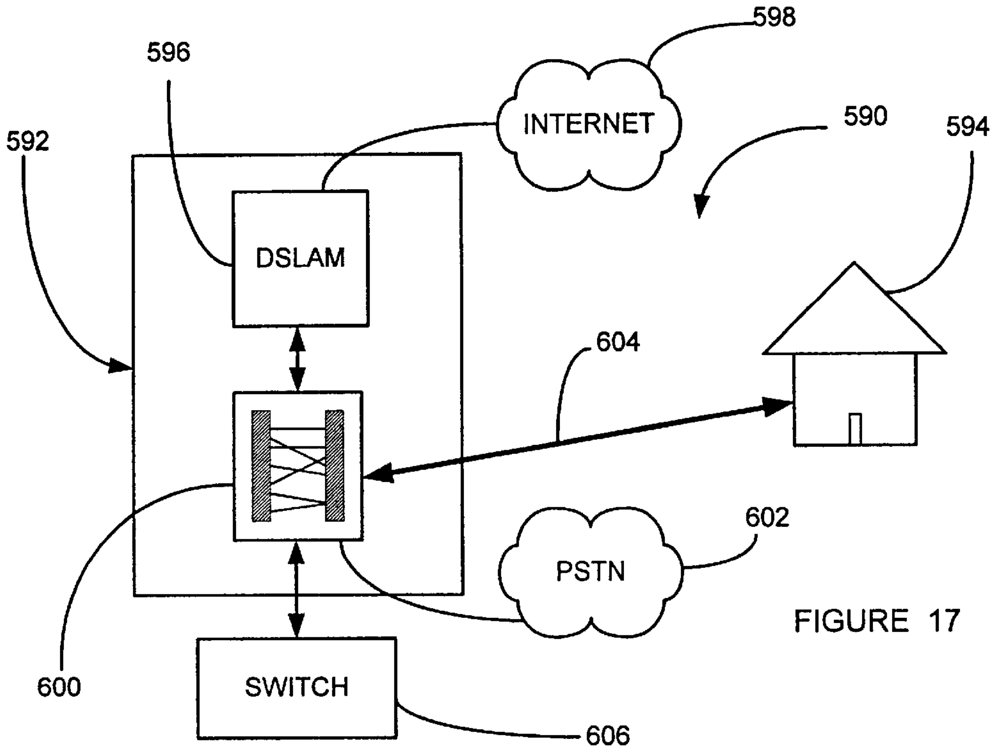
FIG. 17 is a block plan view of an ADSL employing a free space electron switch of the present invention.

FIG. 17 is a block plan view of a digital subscriber line (DSL) network 590 including a central office 592 and a home or business 594 housing telecommunications devices. As is known, a DSL is an advanced, high-bandwidth local loop technology for the transmission of broadband signals. The central office 592 includes a digital subscriber line access multiplexer (DSLAM) 596 in signal communication with the internet 598. A free space electron switch 600 is connected to a public switched telephone network (PSTN) 602 and the DSLAM 596. The switch 600 allows the PSTN 602 to route calls from the internet 598 through the DSLAM 596.

In this embodiment, the central office 592 is connected to the business 594 by a twisted wire pair 604 connection. Further, a class 5 switch 606 is in signal communication with the switch 600 by a twisted wire pair. In an alternate embodiment, the connection is a coaxial cable. In one embodiment, the twisted wire pair 604 is a copper loop. Such a copper loop is well suited to the switch 12 of the invention because the switch generates high voltages easily and efficiently, and high voltages are required for driving copper loops. This reduces power dissipation and decreases heat density, which allows higher port density. Further, since copper loops are subject to power surges, any device that terminates copper loops must be capable of withstanding power surges. The free space electron switch of the present invention is uniquely suited for this termination function, because it does not have any semiconductors within the signal path that might burn out.

Figure 18:
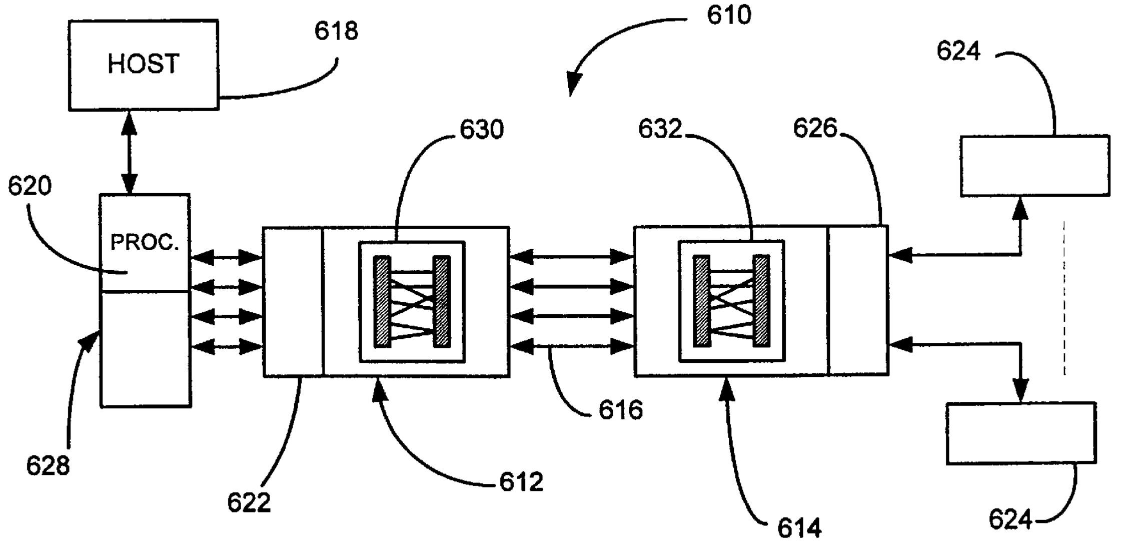
FIG. 18 is a block plan view of a system for frequency division multiplexing in a data communications system employing the free space electron switch of the present invention.

FIG. 18 is a block plan view of a data communications system 610 depicting the free space electron switch of the present invention being used in a multiplexing function. The system 610 includes a first frequency division multiplexer (FDM) 612 and a second FDM 614 in signal communication through a plurality of signal channels 616. The FDM 612 is in signal communication with a host 618 through a channelizer 628, including a processor 620, and a modem 622. The FDM 614 is in signal communication with a plurality of terminals 624 through a modem 626. The FDM 612 includes a free space electron switch 630 and the FDM 614 includes a free space electron switch 632 that provide multiplexing and demultiplexing functions for the input and output channels.

The foregoing discussion discloses and describes merely exemplary embodiments of the present invention. One skilled in the art will readily recognize from such discussion and from the accompanying drawings and claims, that various changes, modifications and variations can be made therein without departing from the spirit and scope of the invention as defined in the following claims.

What is claimed is:

1. A communications system for transmitting a signal from one location to another location on a communications link, said system comprising:

a source generating the signal and transmitting the signal on the link;

a sink receiving the signal on the link transmitted by the source; and at least one free space electron switch positioned within the link between the source and the sink, said free space electron switch receiving the signal on one of a plurality of input channels coupled to the switch, said switch including a cathode array having a plurality of cathodes, one of the cathodes receiving the signal and emitting an electron beam in response thereto, said switch further including an aiming anode and an array of electron beam detectors positioned to receive the electron beam from the cathode, said electron beam traveling from the cathode through free space and said aiming anode directing the electron beam from the cathode to one of the detectors.

2. The system according to claim 1 wherein the switch further includes a plurality of focusing and accelerating electrodes disposed between the cathodes and the electron beam detectors, said focusing and accelerating electrode controlling the speed of the electron beam from the cathode to the detector.

3. The system according to claim 1 wherein the switch further includes a modulating electrode disposed proximate the cathode, said modulating electrode creating an electromagnetic field that imparts a modulation on the electron beam.

4. The system according to claim 1 wherein the switch further includes a blanking electrode, said blanking electrode causing the electron beam to be switched to and from the detector to provide a modulation thereon.

5. The system according to claim 1 wherein the source and sink are selected from the group consisting of a telephone, a computer terminal, a data terminal and a video device.

6. The system according to claim 1 wherein at least a portion of the link is a twisted wire pair.

7. The system according to claim 1 wherein the cathode is a cold cathode.

8. The system according to claim 1 further comprising a plurality of packet nodes interconnected within the link between the source and the sink, and wherein the at least one free space electron switch is a plurality of free space electron switches, where each packet node includes at least one switch.

9. The system according to claim 1 further comprising at least one end office and at least one tandem office interconnected within the link between the host and the sink, wherein the at least one free space electron switch is a plurality of free space electron switch, each end office and each tandem office including at least one of the free space electron switches.

10. The system according to claim 1 wherein the system is an ISDN including a plurality of central offices, and wherein the at least one free space electron switch is a plurality of free space electron switches, where each central office includes at least one free space electron switch.

11. The system according to claim 10 wherein the ISDN further includes terminal adapters, terminal equipment and network terminations.

12. The system according to claim 1 wherein the signal is an optical signal and the cathode converts the optical signal into the electron beam, and wherein the link between the source and sink is an optical link.

13. The system according to claim 12 wherein the plurality of detectors is a plurality of e-beam lasers that convert electrons to an optical signal.

14. The system according to claim 12 wherein the cathode is a photocathode.

15. A communications system for transmitting a signal from one location to another location on a series of communications links, said system comprising:

a plurality of switching offices interconnected by the communications links, each communications office including at least one free space electron switch, said at least one free space electron switch receiving the signal on one of a plurality of input channels coupled to the switch, said switch including a plurality of emitters and a detector array including a plurality of detectors, each emitter including a cathode where the cathode of a selected emitter receives the signal and emits an electron beam in response thereto, said selected emitter further including an aiming anode positioned relative to the cathode and aiming the electron beam to one of the detectors in the detector array, said electron beam traveling through free space from the cathode to the detector; and a communications terminal in signal communication with the links and the at least one switch, said communications terminal receiving the signal from the switch.

16. The system according to claim 15 wherein the switch further includes a focusing and accelerating electrode grid disposed between the cathodes of the emitter and the detector array, said focusing and accelerating electrode grid controlling the speed of the electron beam from the cathode to the detector.

17. The system according to claim 15 wherein the switch further includes a modulating electrode disposed proximate the cathode, said modulating electrode creating an electromagnetic field that imparts a modulation on the electron beam.

18. The system according to claim 15 wherein the switch further includes a blanking electrode, said blanking electrode causing the electron beam to be switched to and from the detector to provide a modulation thereon.

19. The system according to claim 15 wherein at least a portion of the links is a twisted wire pair.

20. The system according to claim 15 wherein the plurality of offices include a plurality of packet nodes.

21. The system according to claim 15 wherein the system is an ISDN including terminal adapters, terminal equipment and network terminations.

22. The system according to claim 15 wherein the plurality of switch offices include a plurality of end offices and at least one tandem office.

23. The switch according to claim 15 wherein the signal is an optical signal and the cathode converts the optical signal into the electron beam, and wherein the series of links are optical links.

24. The system according to claim 23 wherein the plurality of detectors is a plurality of e-beam lasers that convert electrons to an optical signal.

25. The system according to claim 23 wherein the cathode is a photocathode.

26. A communications system for transmitting an optical signal from one location to another location on a communications link, said system comprising:

a source generating the signal and transmitting the signal on the link;

a sink receiving the signal on the link transmitted by the source; and at least one free space electron switch positioned within the link between the source and the sink, said free space electron switch being responsive to an optical input signal on one of a plurality of input channels coupled to the switch, said switch including at least one photocathode being responsive to the optical signal and emitting an electron beam in response thereto, said switch further including an aiming anode and an array of e-beam lasers, said electron beam traveling from the photocathode through free space and said aiming anode directing the electron beam from the photocathode to one of the lasers, said one of the lasers generating an optical output signal in response to the electron beam.

27. The system according to claim 26 wherein the switch further includes a focusing and accelerating electrode grid disposed between the photocathode and the array of e-beam lasers, said focusing and accelerating electrode grid controlling the speed of the electron beam from the photocathode to the e-beam lasers.

28. The system according to claim 26 wherein the source and sink are selected from the group consisting of a telephone, a computer terminal, a data terminal and a video device.

29. The system according to claim 26 further comprising a plurality of packet nodes interconnected within the link between the source and the sink, and wherein the at least one free space electron switch is a plurality of free space electron switches, where each packet node includes at least one switch.

30. The system according to claim 26 wherein the system is an ISDN including a plurality of central offices, and wherein the at least one free space electron switch is a plurality of free space electron switches, where each central office includes at least one free space electron switch.

31. The system according to claim 30 wherein the ISDN further includes terminal adapters, terminal equipment and network terminations.

32. A free space electron device for transmitting a communications signal comprising:

at least one cathode responsive to an input signal, said cathode converting the input signal to a beam of electrons; and a detector array including a plurality of detectors, said electron beam being directed through free space from the cathode to one of the detectors, said detector outputting a modulated communications signal.

33. The device according to claim 32 wherein the cathode is a photocathode that generates the electron beam in response to an optical input signal, and wherein the detectors are e-beam lasers that convert the electron beam to an optical output signal.

34. The device according to claim 32 wherein the at least one cathode is a plurality of cathodes.

35. The device according to claim 32 further comprising an electrode positioned between the cathode and the detector array, said electrode being responsive to a control signal for generating an electromagnetic field that controls the beam of electrons.

36. The device according to claim 35 wherein the electrode is an aiming electrode that directs the beam of electrons to a particular detector.

37. The device according to claim 35 wherein the electrode is a blanking electrode that causes the electron beam to hit a particular detector or be deflected away from the detector for modulation purposes.

38. The device according to claim 35 wherein the electrode is a focusing electrode that gathers and focuses the beam of electrons.

39. The device according to claim 35 wherein the electrode is an accelerating electrode that accelerates the beam of electrons.

* * * * *